US010922487B2

(12) United States Patent
Patel

(10) Patent No.: US 10,922,487 B2
(45) Date of Patent: Feb. 16, 2021

(54) SYSTEMS AND METHODS FOR PROCESSING SHORTHAND ITEMS IN ELECTRONIC COMMUNICATIONS

(71) Applicant: DISH Technologies L.L.C., Englewood, CO (US)

(72) Inventor: Bhavesh Patel, Woodstock, GA (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 16/266,468

(22) Filed: Feb. 4, 2019

(65) Prior Publication Data
US 2019/0171709 A1     Jun. 6, 2019

Related U.S. Application Data

(63) Continuation of application No. 15/056,835, filed on Feb. 29, 2016, now Pat. No. 10,216,722.

(51) Int. Cl.
*G06F 40/274*     (2020.01)
*H04L 12/58*     (2006.01)

(52) U.S. Cl.
CPC .......... *G06F 40/274* (2020.01); *H04L 51/063* (2013.01)

(58) Field of Classification Search
CPC ................................ G06F 17/24; H04L 51/04
USPC ....................................................... 715/271
See application file for complete search history.

(56) References Cited

U.S. PATENT DOCUMENTS

| | | | | |
|---|---|---|---|---|
| 6,385,629 B1 * | 5/2002 | Sundaresan | ......... | G06F 16/2465 715/235 |
| 6,618,697 B1 * | 9/2003 | Kantrowitz | ........... | G06F 17/273 703/2 |
| 7,024,491 B1 * | 4/2006 | Hanmann | ........... | G06F 16/9574 709/248 |
| 7,099,775 B1 * | 8/2006 | Hanshew | ................ | G01S 19/36 340/995.1 |
| 7,236,923 B1 * | 6/2007 | Gupta | ................... | G06F 40/284 704/9 |
| 7,640,233 B2 * | 12/2009 | Baartman | ........... | G06Q 10/107 |
| 8,862,462 B2 * | 10/2014 | Hyde | ................... | G06F 40/289 704/9 |
| 9,020,805 B2 * | 4/2015 | Boguraev | ........... | G06F 17/2735 704/9 |
| 9,390,081 B2 * | 7/2016 | Anders | ................ | G06F 40/166 |

(Continued)

OTHER PUBLICATIONS

Screenshot of MS Windows phone interface.

*Primary Examiner* — Stephen S Hong
*Assistant Examiner* — Broderick C Anderson
(74) *Attorney, Agent, or Firm* — Seed IP Law Group LLP

(57) ABSTRACT

System and methods are disclosed that replace shorthand items such acronyms, abbreviations, jargon, slang, codes, shortcut expressions, emojis, stickers, ideograms and emoticons in an electronic message with expansions, which are definitions or meanings of the shorthand items. Based on a number of times previous messages to the recipient included an expansion of the shorthand item, the system determines whether to stop or to continue expanding the shorthand item in electronic messages to that recipient. This may be based on a threshold or other preferences selected by a user. The system also indicates which text in the message presented to the recipient is an expansion of a shorthand item and suggests shorthand items to insert into outgoing messages based on the text of the message.

28 Claims, 11 Drawing Sheets

(56) References Cited

U.S. PATENT DOCUMENTS

| | | | |
|---|---|---|---|
| 2007/0027852 A1* | 2/2007 | Howard | G06F 3/0237 |
| 2007/0094718 A1* | 4/2007 | Simpson | H04M 1/2748 |
| | | | 726/9 |
| 2007/0174045 A1* | 7/2007 | Kao | G06F 17/278 |
| | | | 704/4 |
| 2008/0059152 A1* | 3/2008 | Fridman | G06F 17/2735 |
| | | | 704/9 |
| 2008/0086297 A1* | 4/2008 | Li | G06F 40/40 |
| | | | 704/3 |
| 2014/0082104 A1* | 3/2014 | Mann | H04L 51/063 |
| | | | 709/206 |
| 2015/0067486 A1* | 3/2015 | Hochman | G06F 40/166 |
| | | | 715/257 |
| 2018/0196921 A1* | 7/2018 | Devarakonda | G06F 19/325 |

\* cited by examiner

SYSTEMS AND METHODS FOR PROCESSING SHORTHAND ITEMS IN ELECTRONIC COMMUNICATIONS

TECHNICAL FIELD

The technical field relates to electronic communications and more particularly, to processing items included in electronic communications.

BRIEF SUMMARY

Use of shorthand items, including acronyms, abbreviations, jargon, slang, codes, shortcut expressions, emojis, stickers, ideograms and emoticons is commonplace in electronic communications. This is especially true in text messaging, email and chat sessions. However, the meaning of such shorthand items is not understood by all and there are often new shorthand items being introduced that many do not know until they are explained and/or used a number of times. Thus, the disclosure presented herein describes a system that replaces these shorthand items in the electronic message with expansions (i.e., definitions or meanings) of the shorthand items. For example, a shorthand item such as the acronym "LOL" may be expanded in the message such that the recipient sees "laugh out loud" instead of "LOL" in the message when the message is presented on the recipient's device. This expansion can occur at the sender's device before sending the message, at the recipient's device before presenting the message or at a server located remotely from both devices before or after the message is sent. Also, the expansions for some or all of the shorthand items can be obtained from the sender's device, from the recipient's device, and/or from one or more databases located remotely from the sender's device and recipient's device. Once learned, however, the recipient may not need to have the shorthand item continue to be expanded for them. Therefore, based on a number of times previous messages to the recipient included an expansion of the shorthand item, the system determines whether to stop or to continue expanding the shorthand item in electronic messages to that recipient. This determination of whether to stop or to continue expanding the shorthand item in electronic messages to that recipient can occur at the sender's device before sending the message, at the recipient's device before presenting the message or at a server located remotely from both devices before or after the message is sent.

The system also indicates which text in the message presented to the recipient is an expansion of a shorthand item. This indication can be made by a marking the expansion, for example, by highlighting, bolding, underlining or placing a box or circle around the expansion within the message presented to the recipient. When the recipient selects the marked expansion, such as by touching it on a touch screen or clicking on it with a mouse, the original shorthand item appears over the expansion and the recipient may be provided an option to not continue having that shorthand item expanded. If the recipient does select to continue to have that shorthand item expanded, the recipient may be given a further option to select how many more times to have that shorthand item expanded in future messages to that recipient. Such a selectable option may also be provided to the sender and may be set differently for different senders and/or recipients.

Often, a shorthand item may have many possible meanings. Thus, as the sender is writing the message or sometime before the message is sent, the system may present the sender with multiple expansions from which to select that will replace a particular occurrence of a shorthand item in the message. The system may also automatically select an appropriate expansion based on the content of the message in which the shorthand item appears. These multiple expansions may be stored at the sender's device or at a server located remotely from the sender's device. The selection of which of these multiple expansions to present to the sender, or which to replace the shorthand item with in the message, may occur at the sender's device before sending the message or at a server located remotely from the sender's device.

The system may also suggest shorthand items with which to replace text in messages as they are being written by the sender or sometime before they are sent to the recipient. For example, as the message is being written by the sender, the system may suggest to the sender to replace the word "sad" typed in the message by the sender with a sad face emoji or sad face emoticon. The selection of which suggestions to provide to the sender can occur at the sender's device before sending the message or at a server located remotely from the sender's device.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
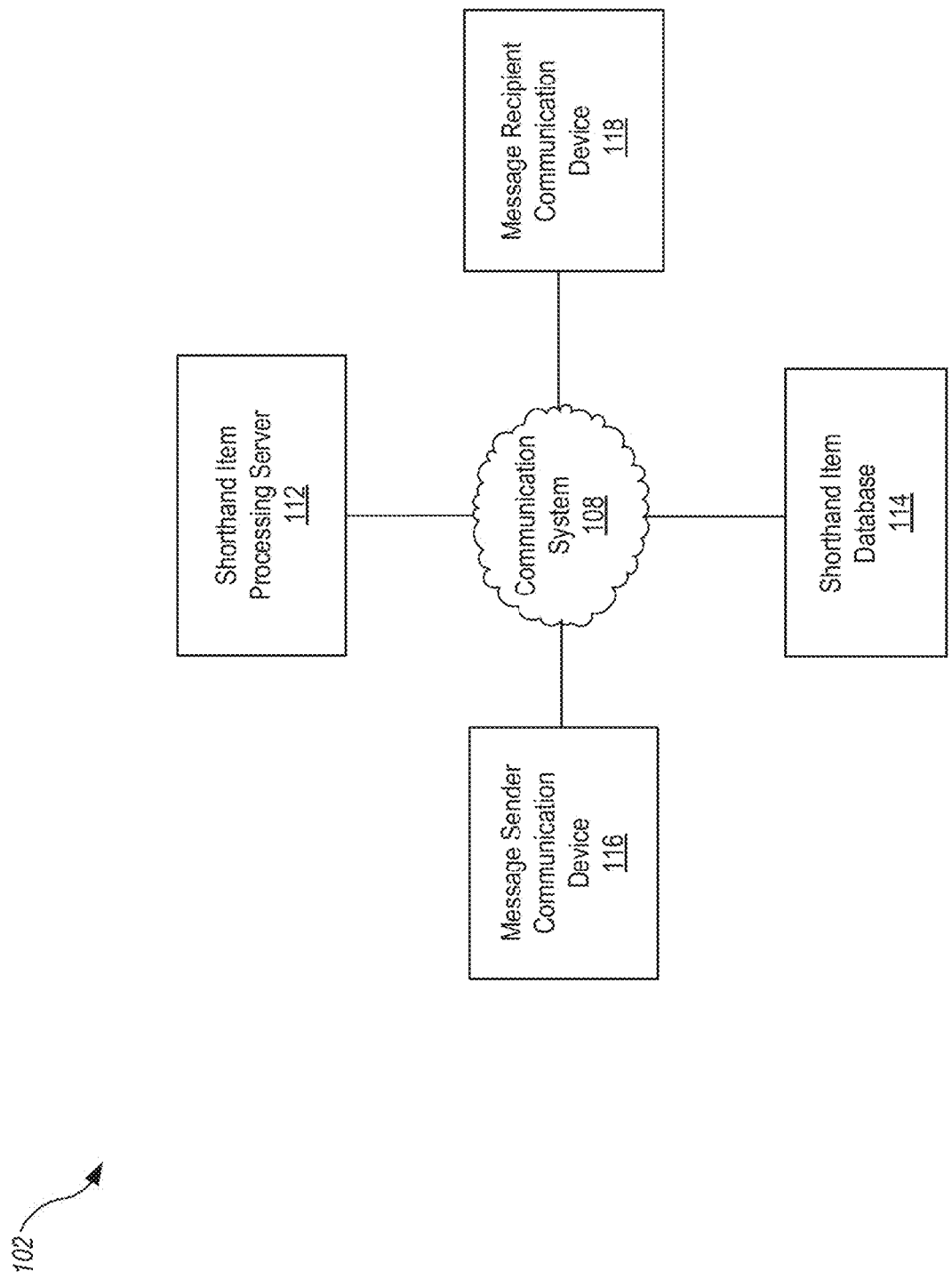
FIG. 1 is a block diagram illustrating an example networked environment in which embodiments of systems and methods for processing shorthand items in electronic communications may be implemented, according to one embodiment.

FIG. 1 is a block diagram illustrating an example networked environment 102 in which embodiments of systems and methods for processing shorthand items in electronic communications may be implemented. Shown in FIG. 1 is a shorthand item processing server 112, a shorthand item database 114, a message sender communication device 116 and a message recipient communication device 118 each operably connected to each other via communication system 108.

The systems and methods described herein replace shorthand items in electronic messages with expansions (i.e., definitions or meanings) of the shorthand items such that a recipient of the message can understand what is being communicated. Shorthand items, for example, may include acronyms, abbreviations, jargon, slang, codes, shortcut expressions, emojis, stickers, ideograms and/or emoticons which are often included by the sender in electronic communications such as text messages, emails and chat messages. For example, a shorthand item such as the acronym "IDK" may be expanded in the message such that the recipient sees "I don't know" instead of "IDK" in the message when the message is presented on the recipient's device.

This expansion can occur at the message sender communication device 116 before sending the message, at the message recipient communication device 118 before presenting the message or at a shorthand item processing server 112 located remotely from both the message sender communication device 116 and the message recipient communication device 118 before or after the message is sent from the message sender communication device 116. Also, the expansions for some or all of the shorthand items can be obtained from the message sender communication device 116, the message recipient communication device 118, the shorthand item processing server 112 and/or from one or more databases, such as shorthand item database 114, located remotely from the message sender communication device 116 and the message recipient communication device 118.

Once learned, however, the recipient may not need to have the shorthand item continue to be expanded for them. Therefore, based on a number of times previous messages to the recipient included an expansion of the shorthand item, the system determines whether to stop or to continue expanding the shorthand item in electronic messages to that recipient. This determination of whether to stop or to continue expanding the shorthand item in electronic messages to that recipient can occur at the message sender communication device 116 before sending the message, at the message recipient communication device 118 before presenting the message, or at the shorthand item processing server 112 located remotely from the message sender communication device 116 and the message recipient communication device 118 before or after the message is sent.

The message sender communication device 116 and the message recipient communication device 118 may each be any device that is capable of communicating electronically with the other. For example, such electronic communication may include, but is not limited to one or more of: text messaging; Short Message Service (SMS) communication; communication using standardized phone protocols defined as part of the Global System for Mobile Communications (GSM) series of standards for sending text messages to and from GSM mobile handsets: communication via the American National Standards Institute (ANSI) code division multiple access (CDMA) networks and Digital Advanced Mobile Phone System (AMPS); communication via the International Mobile Telecommunications-2000 (IMT-2000) specifications by the International Telecommunication Union (3G); communication via the International Mobile Telecommunications-Advanced (IMT-Advanced Standard or "4G"); satellite and landline networks communication via any standardized communication protocols to allow fixed line or mobile phone devices to exchange text messages; Multimedia Message Service (MMS) communication; Internet communications; electronic mail (email), instant messaging (IM); online chat, web chat; Internet Relay Chat (IRC); communication via any application layer protocol that facilitates communication in the form of text; voice-to-text communication applications; text-to-voice communication applications; real-time communication between two users via an electronic communication device; real-time communication between two users via accessible web interfaces; real-time communication between two users via one or more mobile device applications; etc. Online chat may refer to any kind of communication over the Internet that offers a real-time or near real-time transmission of text messages from sender to receiver. Online chat may include web-based applications or native applications running on a mobile device or other type of computing device that allows communication between users in a multi-user environment over the Internet or other communications channel.

Examples of what the message sender communication device 116 and the message recipient communication device 118 are in various embodiments include, but are not limited to, one or more of: a computer, a notebook computer, a laptop computer, a tablet computer, a personal digital assistant, a telephone, a cellular telephone, a mobile device, a mobile handset, a smartphone, an iPhone® mobile device, a Samsung® mobile device, an Android® mobile device, a Windows® mobile device, a Blackberry® mobile device, another smartphone and/or tablet device, a watch, a wearable device, a media player, a gaming console, a television converter, a set-top box, a television receiving device, a television recording device, a satellite set-top box, a satellite receiving device, a cable set-top box, a cable receiving device, a television tuner, etc.

The shorthand item processing server 112, shorthand item database 114, message sender communication device 116, and message recipient communication device 118, may communicate with each other over communication system 108. Communication system 108 may include many different types of communication media, now known or later developed. For example, communication system 108 may include communication networks or portions thereof, which implement and/or operably support one or more of the example types of electronic communication between message sender communication device 116 and message recipient communication device 118 described above. Non-limiting examples include telephony systems; cellular telephone networks, computer wireless fidelity (Wi-Fi) networks; the Internet; internets; intranets; local area network (LAN) systems; Internet Protocol (IP) systems; terrestrial television systems; digital terrestrial television (DTTV) systems; digital television terrestrial broadcasting (DTTB) systems; cable systems; fiber optic systems; microwave systems; asynchronous transfer mode (ATM) systems; frame relay systems; digital subscriber line (DSL) systems; Digital Video Broadcasting (DVB) systems over cable, satellite, terrestrial and mobile networks, and other radio frequency ("RF") systems and satellite systems. In some embodiments, communications over communication system 108 may be over one or more wired communications channels (e.g., twisted pair wiring, optical fiber) and/or wireless communications channels (e.g., radio, microwave, satellite, IEEE 801.11 compliant). Networked communications channels of communication system 108 may include one or more local area networks (LANs), wide area networks (WANs), extranets, intranets, or the Internet including the Worldwide Web portion of the Internet. For example, in one embodiment, text messages may be sent between message sender communication device 116 and message recipient communication device 118 over a cellular telephone network while communications between message sender communication device 116, shorthand item processing server 112 and shorthand item database 114 may be sent over the Internet via a Wi-Fi connection.

A database of the shorthand items and their associated possible expansions may be stored in the shorthand item database 114. Also or instead, one or more databases of shorthand items and their associated possible expansions may be stored on the message sender communication device 116 and/or message recipient communication device 118. The message sender communication device 116, shorthand item processing server 112 and/or message recipient communication device 118 may access the shorthand item database 114 over communication system 108 on an as-needed basis or may download the data in batches from the shorthand item database 114. For example, message sender communication device 116 may read the text of a message written by the sender and detect a shorthand item in the message. In order to detect the shorthand items in the message from the sender, the message sender communication device 116 may query or download a list of shorthand items from the shorthand item database 114 beforehand so the message sender communication device 116 can compare the text in the message from the sender with that list to see if there are any matches. The message sender communication device 116 may query the shorthand item database 114 to obtain the expansion for that shorthand item or may have previously downloaded the expansion from the shorthand item database 114.

The message sender communication device 116 may then replace the shorthand items detected in the message with the associated expansions. This may occur while the sender is writing the message as each shorthand item is detected or in some embodiments after the sender selects "send" to send the message to the recipient. In some embodiments, this occurs automatically or in the background on the message sender communication device 116 such that the sender is never aware of it. In some embodiments, the sender may initiate, or be given an option to initiate, the expansion of the shorthand items in the message with a specific command such as "expand shorthand items" or "expand message" before or after providing the "send" command. This expansion option provided to the sender may be provided for each shorthand item individually or for all the shorthand items in the entire message, either during or after the message has been written.

In some embodiments, the message sender communication device 116 may send the entire message, or portions thereof, to the shorthand item processing server 112, and then the shorthand item processing server 112 reads the text of the message written by the sender and detects a shorthand item in the message. In order to detect the shorthand items in the message from the sender, the shorthand item processing server 112 may query or download a list of shorthand items from the shorthand item database 114 beforehand so the shorthand item processing server 112 can compare the text in the message from the sender with that list to see if there are any matches. The shorthand item processing server 112 may query the shorthand item database 114 to obtain the expansion for that shorthand item or may have previously downloaded the expansion from the shorthand item database 114. The shorthand item processing server 112 may then send the detected shorthand items and associated expansions to the message recipient communication device 118 along with the original message or to the message sender communication device 116 such that the message recipient communication device 118 or message sender communication device 116 can perform the expansion operation to replace the shorthand items in the message with the associated expansions.

In some embodiments, the shorthand item processing server 112 also performs the expansion operation. For example, the message sender communication device 116 may send the message to the shorthand item processing server 112 and the shorthand item processing server 112 may then perform the detection of shorthand items and expansion of those shorthand items based on its own database of shorthand items and associated expansions or based on information accessed from an external database, such as shorthand item database 114. The shorthand item processing server 112 will then send the expanded message to the message recipient communication device 118. In some embodiments, the shorthand item processing server 112 may send the original message to the message recipient communication device 118 along with the indication of which shorthand items were detected in the message and their associated expansions such that the message recipient communication device 118 can perform the expansion of the message after it is received by the message recipient communication device 118 and indicate to the recipient which text in the message presented to the recipient on the message recipient communication device 118 represents an expanded shorthand item.

In some embodiments, some or all of the detection of shorthand items in messages and the expansion of those items in the message may be performed by the message recipient communication device 118. For example, the message recipient communication device 118 may receive a text message from the message sender communication device 116 that includes shorthand items. The message recipient communication device 118 may then detect such shorthand items based on its own database of shorthand items and/or based on information received from shorthand item database 114. The message recipient communication device 118 may then expand one or more shorthand items in the message before or after presenting the message to the recipient by replacing the shorthand item in the message with its associated expansion. In some embodiments, the message recipient communication device 118 may receive information with the original text message indicating which shorthand items may need to be expanded. This information may be received from the message sender communication device 116 and/or the shorthand item processing server 112. The message recipient communication device 118 may then expand one or more of the indicated shorthand items in the message before or after presenting the message to the recipient by replacing the indicated shorthand item in the message with its associated expansion.

In some embodiments, the message recipient communication device 118 may send the message to the shorthand item processing server 112 and the shorthand item processing server 112 may then perform the detection of shorthand items and send information to the message recipient communication device 118 indicating which shorthand items may need to be expanded. In other embodiments, the shorthand item processing server 112 performs the expansion of those shorthand items based on its own database of shorthand items and associated expansions or based on information accessed from an external database, such as shorthand item database 114. The shorthand item processing server 112 will then send the expanded message to the message recipient communication device 118. In some embodiments, the shorthand item processing server 112 may send the expanded message to the message recipient communication device 118 along with an indication of which shorthand items were expanded in the message and their associated expansions such that the message recipient communication device 118 can indicate to the recipient which text in the message presented to the recipient on the message recipient communication device 118 represents an expanded shorthand item.

Any of the operations, including detection of shorthand items in the message, expansion of those shorthand items in the message and sending of information regarding which shorthand items were or could be expanded, may be performed by one or more of the message sender communication device 116, shorthand item processing server 112 and the message recipient communication device 118. Any of the operations, including detection of shorthand items in the message, expansion of those shorthand items in the message and sending of information regarding which shorthand items were or could be expanded, can be performed while the message is being written, after the message is sent, before the message is received, after the message is received, before the message is presented to the recipient or after the message is presented to the recipient.

Note that even though only one shorthand item database 114 is illustrated in FIG. 1 as an example, there may be multiple local and/or remote databases or other sources of information regarding shorthand items and their associated expansions accessible and utilized by the shorthand item processing server 112, message sender communication device 116 and/or message recipient communication device 118 over communication system 108. For instance, the message sender communication device 116 and/or the message recipient communication device 118 may receive user input indicating what the meanings of various shorthand items are. The message sender communication device 116 and/or the message recipient communication device 118 may store this information locally and/or send this information to be stored by the shorthand item database 114 and/or the shorthand item processing server 112 for later access by the message sender communication device 116, message recipient communication device 118, shorthand item processing server 112 and/or the shorthand item database 114. In this manner, the system can learn shorthand items and their preferred expansions from the users who are using the system.

In one embodiment, the user of the message sender communication device 116, the message recipient communication device 118 or another device may save shorthand items and associated expansions on the respective device and/or upload shorthand items and associated expansions to the shorthand item database 114 and/or the shorthand item processing server 112 for later access by the message sender communication device 116, message recipient communication device 118, shorthand item processing server 112 and/or the shorthand item database 114. The uploads may occur in response to a user initiating the upload or as the user is typing the message and the system recognizes an item as being a possible shorthand item for which the system prompts the user for the associated expansion. In some embodiments, the system may recognize an item as a possible shorthand item and save the item for future reference, such as to cross reference it with other databases or with other messages from that user or other users in order to determine the associated expansion. In various embodiments, this may occur during or after the user is typing the message, before or after the user has sent the message or before or after the message has been received by the recipient. In this manner, the system can also learn shorthand items and their preferred expansions from the users who are using the system.

For example, often, a shorthand item may have many possible meanings. Thus, as the sender is writing the message or sometime before the message is sent, the system may present the sender with multiple expansions from which to select that will replace a particular occurrence of a shorthand item in the message. The system may also automatically select an appropriate expansion based on the content of the message in which the shorthand item appears. These multiple expansions may be stored at the sender's device or at a server located remotely from the sender's device, such as at shorthand item processing server 112 or shorthand item database 114. In some embodiments, the selection of which of these multiple possible expansions to present to the sender, or which to replace the shorthand item with in the message, may occur at the message sender communication device 116 before sending the message or at the shorthand item processing server 112 located remotely from the message sender communication device 116. Thus, the next time the system encounters the same shorthand item in the same or a subsequent message, the expansion selected previously to replace that shorthand item may be used.

Additionally, the system may cross-reference multiple external sources over communication system 108, any of which may serve as shorthand item database 114, and perform an analysis to determine the most likely applicable expansion based on the context of the shorthand item in the message and/or based on previous user input. Such sources may include, but are not limited to: web sites, urban dictionaries, specialized acronym databases, jargon databases, shorthand item databases, slang databases, etc. These sources may be independently updated such that the system has access to current information. The expansion determined to be most likely applicable to a particular shorthand item may be suggested to the user or automatically selected as the expansion with which to replace the shorthand item in the message. Also, one or more of these sources may also or instead be updated based on actual selections of expansions of the shorthand items detected in the messages as described herein by the sender using message sender communication device 116 and/or the recipient using message recipient communication device 118 when writing or receiving such messages.

The above description of the networked environment 102 and the various devices therein, is intended as a broad, non-limiting overview of an example environment in which various embodiments of systems and methods for processing shorthand items in electronic communications may be implemented. FIG. 1 illustrates just one example of a networked environment 102 and the various embodiments discussed herein are not limited to such environments. In particular, networked environment 102 and the various devices therein, may contain other devices, systems and/or media not specifically described herein.

Example embodiments described herein provide applications, tools, data structures and other support to implement how a system processes shorthand items in electronic communications. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described is not limited by the particular order, selection, or decomposition of steps described with reference to any particular module, component, or routine.

Figure 2A:
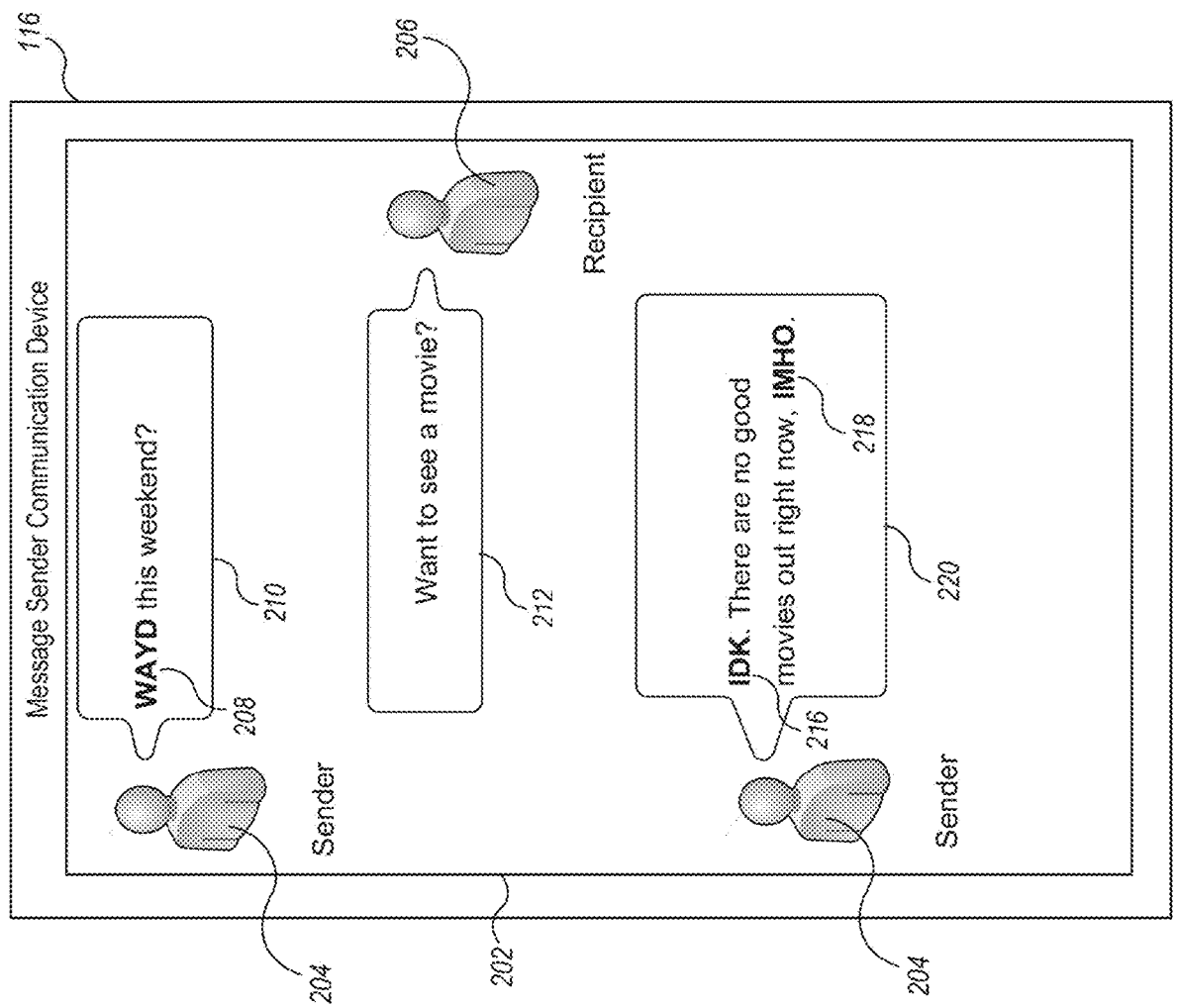
FIG. 2A is an example user interface on a message sender communication device showing example shorthand items typed in the messages by the sender, according to one embodiment.

FIG. 2A is an example user interface 202 on message sender communication device 116 of a sender showing example shorthand items typed in the messages by the sender, according to one embodiment. The user interface 202 is generated by a text messaging application running on the message sender communication device 116. The user interface 202 shows a text message conversation occurring between the sender and the recipient. The sender is represented by a sender icon 204 and the recipient is represented by a recipient icon 206. The message 210 on the top of the user interface 202 is the oldest message and the message 220 on the bottom of the user interface 202 is the newest message. In particular, the user interface 202 shows that the sender represented by sender icon 204 first sent message 210, the recipient represented by recipient icon 206 replied by sending message 212 and the sender then sent message 220. The sender has typed the shorthand item "WAYD" 208 in message 210 and then types the shorthand items "IDK" 216 and "IMHO" 218 in the subsequent message 220.

In the example shown in FIG. 2A, the text messaging application, chat application, software plug-in, application programming interface (API), shorthand item processing server 112, system module running on the message sender communication device 116 or other system module that communicates with one or more of these components, takes as input the text of message 210 and message 220 written by the sender and then detects the shorthand items "WAYD" 208, "IDK" 216 and "IMHO" 218 within the text of message 210 and message 220. This detection may be performed by matching particular shorthand items to one or more items on a list of shorthand possible items. As described above, this detection may be performed by the shorthand item processing server 112 after the message, or a portion thereof, is forwarded to the shorthand item processing server 112, or instead by the message recipient communication device 118 after the message is received by the message recipient communication device 118. This detection may also be based on information received from the shorthand item database 114 and/or other sources indicating shorthand items and their associated expansions.

The text messaging application, chat application, software plug-in, application programming interface (API), shorthand item processing server 112, system module running on the message sender communication device 116 or other system module that communicates with one or more of these components may detect the shorthand items "WAYD" 208, "IDK" 216 and "IMHO" 218 as the message is being written, after the sender selects a "send" command or the like (not shown), or in response to selection of a specific option provided to the sender on the message sender communication device 116 to perform this detection operation. Thus, the text may be analyzed for detection of shorthand items as each word is written or as each message is completed. In some embodiments, the detection of a shorthand item may be based on the context of the conversation or message in which the shorthand item is written and thus, the system may wait until the message is completed before detecting the shorthand items in the message. The completion of the message may be indicated, for example, by the user selecting "send" or another command (not shown) within the user interface 202 indicating the message is complete.

In some embodiments, the text that is detected as being a shorthand item may be indicated to the sender, for example, by the message sender communication device 116 highlighting, bolding, underlining and/or placing a box or circle around the detected shorthand item within the message. In the example shown in FIG. 2A such an indication is shown by bolding of the shorthand items "WAYD" 208, "IDK" 216 and "IMHO" 218 in the message on the user interface 202. The sender may initiate, or be given an option to initiate, the expansion of the detected shorthand items in the message for the recipient with a specific command such as "expand shorthand items" or "expand message" before or after providing the "send" command. This expansion option provided to the sender may be provided for each shorthand item individually or for all the shorthand items in the entire message, either during or after the message has been written. For example, the sender may be given an option to have the individual bolded shorthand item expanded in the message that is presented to the recipient or in the message shown on the message sender communication device 116 before it is sent. In some embodiments, the sender may touch or press on the bolded shorthand item and then may be prompted (not shown) to indicate whether the sender would like to have that particular shorthand item expanded in the message that is presented to the recipient on the message recipient communication device 118 or in the message shown on the message sender communication device 116 before it is sent. For instance, when the sender touches the bolded shorthand item "WAYD" the associated expansion "What are you doing" may appear over the bolded shorthand item or in another location within the user interface 202.

The sender may then be provided a number of options (not shown) regarding the selected shorthand item. For example, these options may include, but are not limited to, one or more of: expand the shorthand item in the message presented to the recipient; always expand the shorthand item in the messages presented to the recipient; expand the shorthand item within the message presented on message sender communication device 116; always expand the shorthand item within messages presented on message sender communication device 116; discontinue or continue detecting this as a shorthand item; discontinue or continue detecting this as a shorthand item for the recipient; discontinue or continue detecting this as a shorthand item for one or more particular recipients; discontinue or continue expanding this shorthand item; discontinue or continue expanding this shorthand item for the recipient; discontinue or continue expanding this item for one or more particular recipients. Selections of such options may be stored as user preferences to be followed going forward for the sender when that sender uses any communication device, uses selected communication devices or specifically uses message sender communication device 116 on which the message is being written. This option of which electronic communication device to apply the sender's preferences to may also be selectable by the sender and may be stored on the message sender communication device 116 or remotely within a user profile or an account associated with the sender. In this manner, such preferences may be accessed and followed across multiple devices associated with the sender.

Figure 2B:
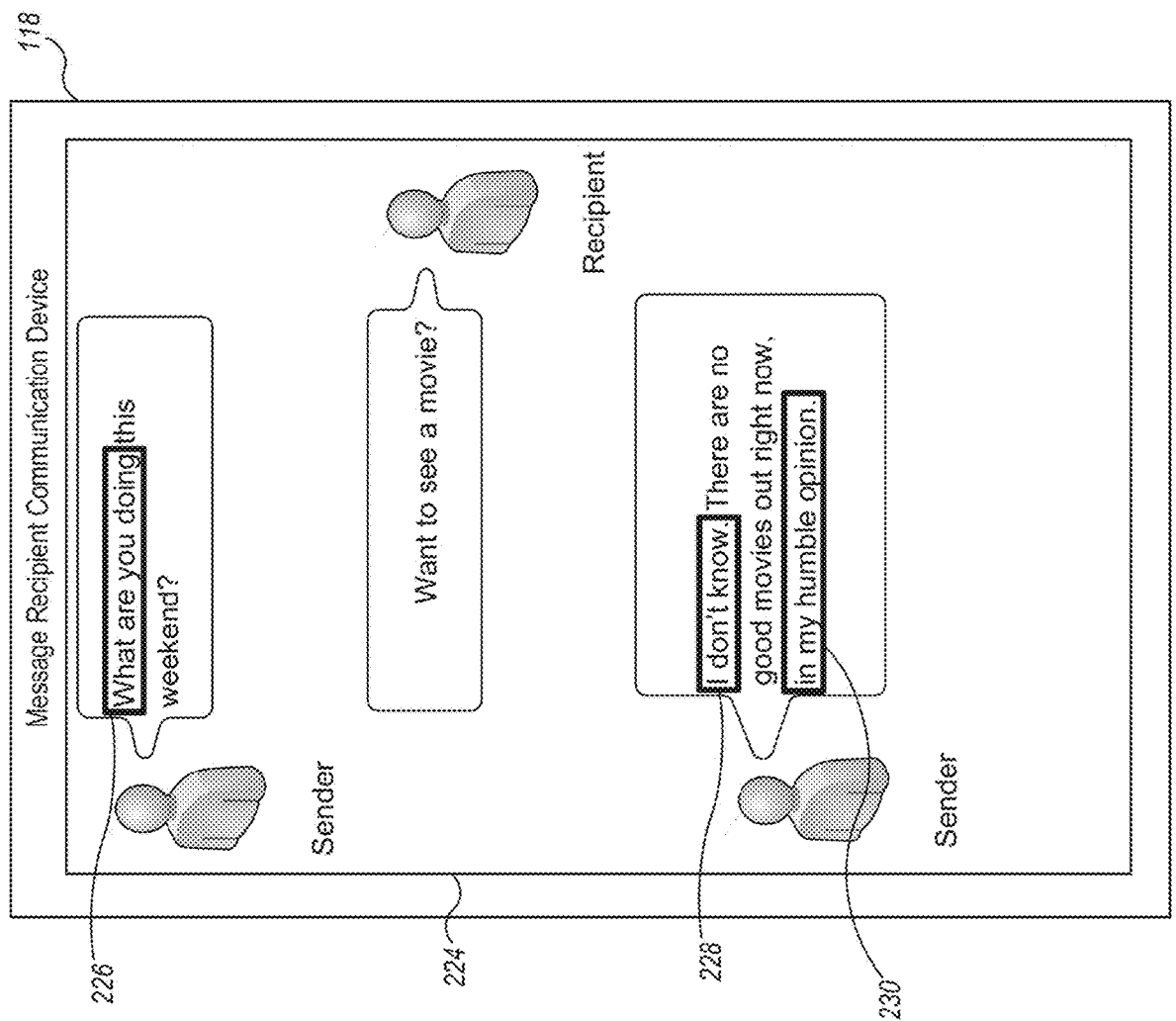
FIG. 2B is an example user interface on a communication device of a recipient of the messages of FIG. 2A showing expansions replacing the example shorthand items in the messages from the sender, according to one embodiment.

FIG. 2B is an example user interface on the message recipient communication device 118 of the recipient of the messages shown in FIG. 2A from the sender. In particular, FIG. 2B shows the text message conversion of FIG. 2A as seen by the recipient on the message recipient communication device 118. FIG. 2B shows expansions 226, 228 and 230 replacing the respective example shorthand items 208, 216 and 218 in the messages from the sender. As shown, the expansion "What are you doing" 226 replaces the shorthand item "WAYD" 208, the expansion "I don't Know" 228 replaces the shorthand item "IDK" 216 and the expansion "in my humble opinion" 230 replaces the shorthand item "IMHO" 218. As described above, this replacement may be performed by the message sender communication device 116 before the message is sent, by the shorthand item processing server 112 on the message's way to the message recipient communication device 118 or by the message recipient communication device 118 once received. Such expansions can also be made in text messages that are or have been converted to audio messages. For example, when the sender types a shorthand item in a text message the recipient may receive an audio version of the text message and hear the expansion instead of the shorthand item.

As shown in FIG. 2B, the system indicates on the user interface 224 of the message recipient communication device 118 which text in the messages presented to the recipient on the message recipient communication device 118 is an expansion of a shorthand item. This indication can be made by marking the expansion, for example, by highlighting, bolding, underlining or placing a box or circle around the expansion within the message presented to the recipient on the message recipient communication device 118. Other indications that particular text within the message is an expanded shorthand item may instead or also be used. In the example of FIG. 2B, the expansions 226, 228 and 230 are indicated by the system placing a box placed around each expansion in the user interface 224.

In some embodiments, a rating may be assigned to the shorthand item typed in the original message to the recipient. This rating may be assigned by the message sender communication device 116, the shorthand item processing server 112, the message recipient communication device 118 or the shorthand item database 114. Parental controls may be applied to the message based on the recipient to whom the message was sent and the assigned rating of the shorthand item in the message. For example, if the message recipient communication device 118 receives a message with a shorthand item that has a rating indicating the shorthand item is not appropriate for children under a certain age, the message recipient communication device 118 may determine to remove or not expand that shorthand item when the message is presented to the recipient on the message recipient communication device 118. This determination may also be made by the message sender communication device 116 and/or the shorthand item processing server 112 before the message is received by the message recipient communication device 118.

Figure 2C:
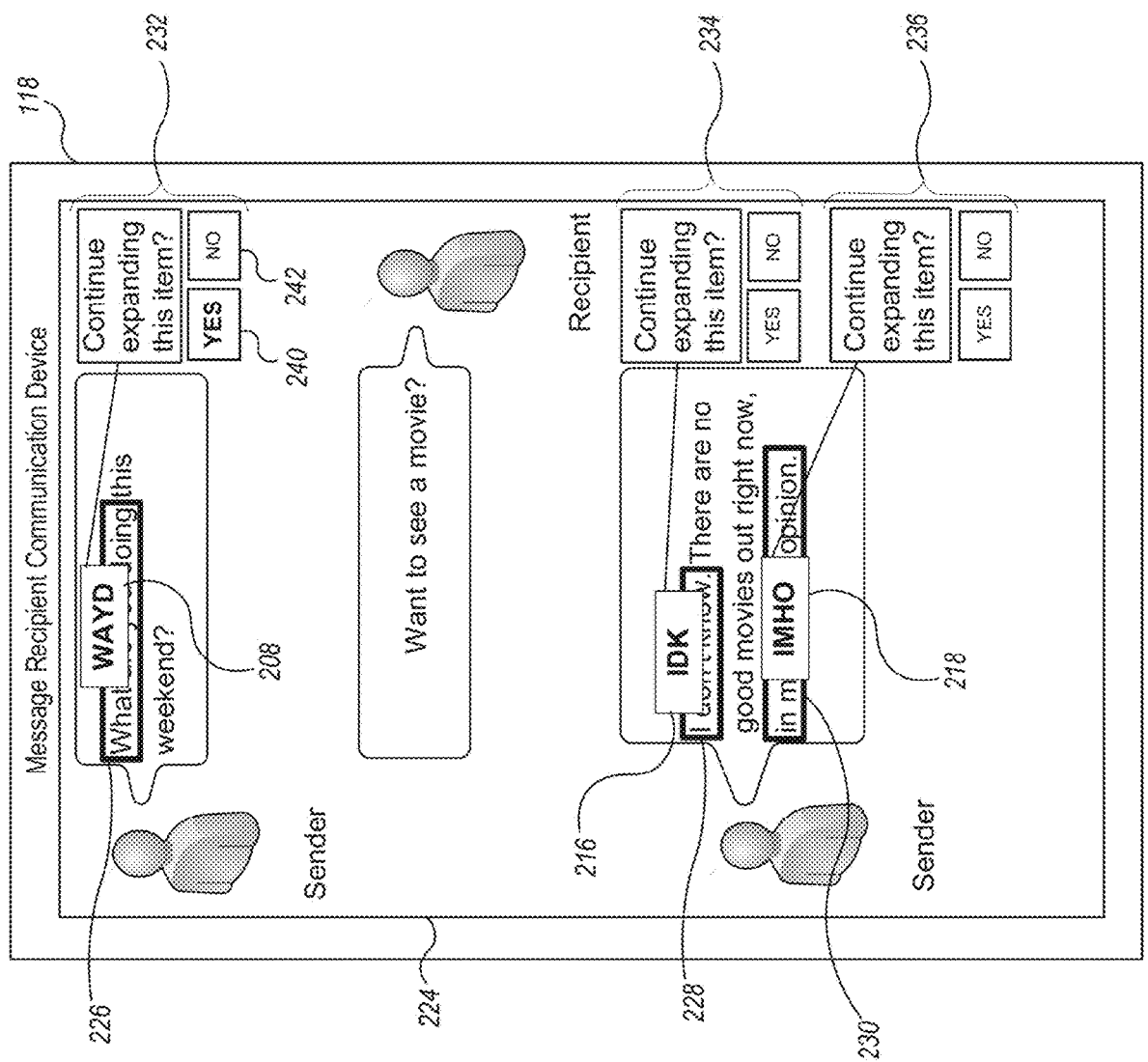
FIG. 2C is an example user interface on the communication device of the recipient of the messages of FIG. 2B showing in the messages the original shorthand items that the expansions had replaced, according to one embodiment.

FIG. 2C shows in the user interface 224 the original shorthand items that the expansions had replaced in the messages, according to one embodiment. For example, when the recipient selects the marked expansion, such as by touching it on a touch screen on the message recipient communication device 118 or clicking on it with a mouse or stylus, the original shorthand item appears over the expansion and the recipient may be provided an option to not continue having that shorthand item expanded. As shown in the example provided in FIG. 2C, when the user selects the boxed expansion "What are you doing" 226, the corresponding shorthand item "WAYD" 208 appears within the message in a pop-up box over the expansion for that shorthand item. Similarly, when the user selects the boxed expansion "I don't know" 228, the corresponding shorthand item "IDK" 216 appears within the message in a pop-up box over the expansion for that shorthand item. Also, when the user selects the expansion "In my humble opinion" 230, the shorthand item "IMHO" 218 appears within the message in a pop-up box over the expansion for that shorthand item. In some embodiments, the shorthand items may appear in other places within the user interface 224 (e.g., below the message or above the message) when then respective expansion is selected. In some embodiments, the shorthand items may appear automatically without being selected and/or may appear for a limited amount of time and then disappear. Additionally or instead, the shorthand items may disappear in response to the user touching or otherwise selecting the shorthand item and may reappear again in response to the user selecting the corresponding expansion.

The system then presents on the user interface 224, for each expanded shorthand item, an option for the recipient to not continue having that shorthand item expanded. In the example shown in FIG. 2C, this option is presented as a prompt that appears next to the message when the user selects the corresponding expansion. In particular, when the user selects the expansion "What are you doing" 226, the "continue expanding this item?" prompt 232 appears. Similarly, when the user selects the expansion "I don't know" 228, the "continue expanding this item?" prompt 234 appears. Then, when the user selects the expansion "in my humble opinion" 230, the "continue expanding this item?" prompt 236 appears. In some embodiments, the prompts 232, 234 and 236 may appear all at the same time when the recipient selects any expansion, may appear instead in response to each selection by the recipient of the shorthand items 208, 216 and 218, respectively, or the shorthand items 208, 216 and 218 may not appear at all. In some embodiments, there may be one prompt provided for and applicable to all the expansions in a particular message or conversation.

In the example shown in FIG. 2C, the recipient has selected "YES" option 240 in response to the prompt 232 inquiring whether the user would like to have the "WAYD" shorthand item continue to be expanded in messages to that recipient. This is shown by the "YES" option 240 being bolded in the prompt 232. In some embodiments this may cause all messages from that particular sender to that particular recipient to have the "WAYD" shorthand item continue to be expanded. In other embodiments, this may cause all messages from any sender to that particular recipient to have the "WAYD" shorthand item continue to be expanded. This also applies when the recipient selects to not have the shorthand be expanded in future messages. For example, if the recipient had selected the "NO" option 242 in prompt 232, in some embodiments this may cause all messages from that particular sender to that particular recipient to stop having the "WAYD" shorthand be expanded. In other embodiments, this may cause all future messages from any sender to that particular recipient to not have the "WAYD" shorthand item be expanded.

Information indicating the recipient's preferences regarding this option whether to have particular shorthand items be expanded in messages to that recipient may be stored on the message recipient communication device 118 of the recipient or remotely within a user profile or an account associated with the recipient. Also, this information indicating the recipient's preference regarding this option to have particular shorthand items expanded in messages to that particular recipient may be stored on the message sender communication device 116 of the sender or remotely within a user profile or an account associated with the sender. For example, such preferences may be stored at the shorthand item processing server 112 shown in FIG. 1. In this manner, such preferences are able to be accessed and followed across multiple devices associated with the sender and recipient. Such preferences are also able to be accessed and followed by multiple senders to apply when sending messages to that recipient.

Figure 2D:
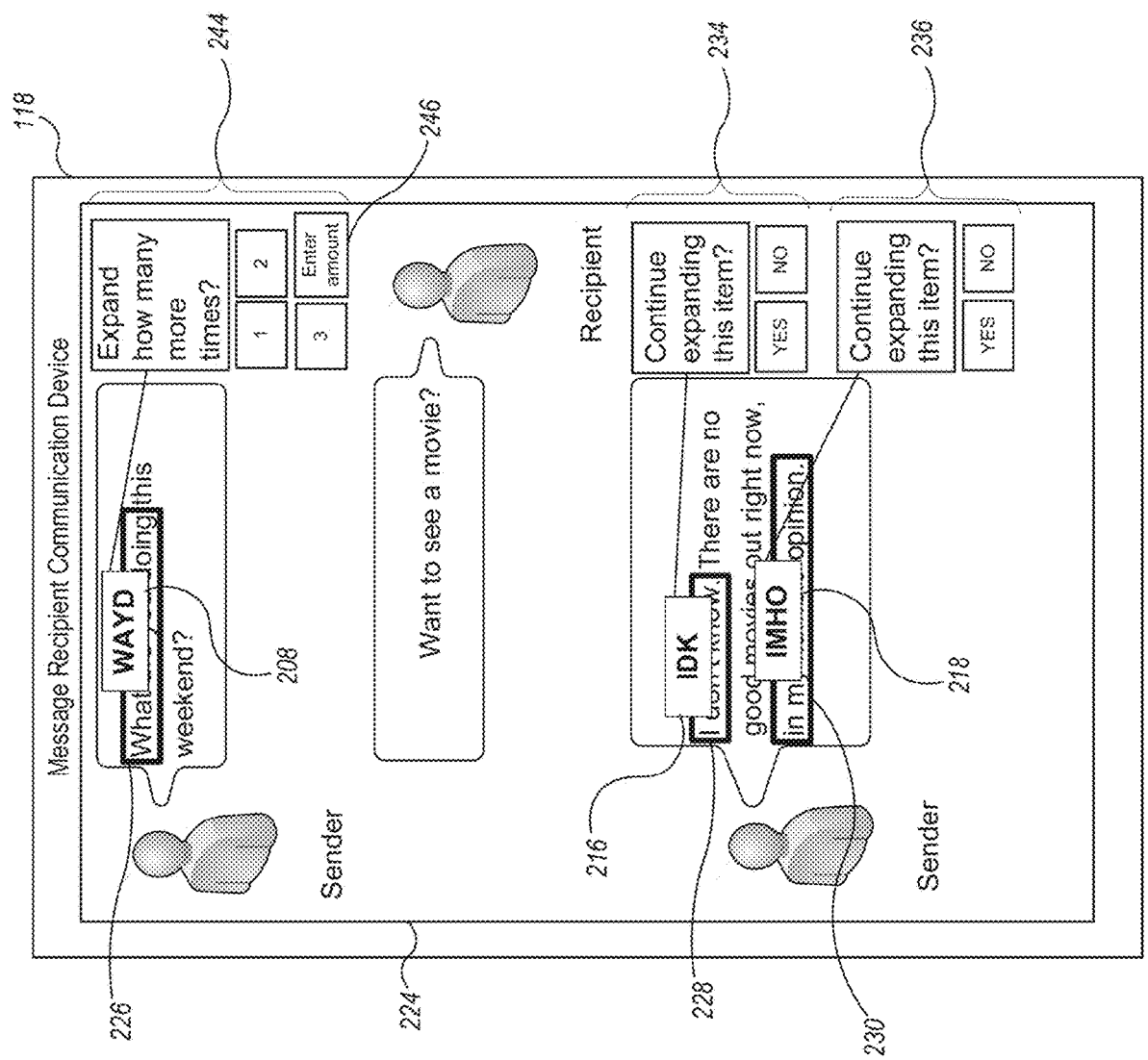
FIG. 2D is an example user interface on the communication device of the recipient of the messages of FIG. 2C showing an example option being provided of how many times to continue expanding each shorthand item in future messages, according to one embodiment.

FIG. 2D shows is the example user interface 224 on the message recipient communication device 118 presenting an example option being provided of how many times to continue expanding each shorthand item in future messages, according to one embodiment. If the recipient does select to continue to have that shorthand item expanded, such as, for example, by selecting the "YES" option 240 in response to the prompt 232 shown in FIG. 2C inquiring whether the user would like to have the "WAYD" shorthand item continue to be expanded, the user interface 224 may in response provide a number of options from which the recipient may select. For example, the user interface 224 may provide a further option to select how many more times to have that shorthand item expanded in future messages to that recipient. As an example of how this option may be provided on user interface 224, shown in FIG. 2D is an "Expand how many more times?" prompt 244 that appears in response to the recipient selecting the "YES" option 240 in the prompt 232 shown in FIG. 2C inquiring whether the user would like to have the "WAYD" shorthand item continue to be expanded. The "Expand how many more times?" prompt 244 provides the recipient various options to have the shorthand item be expanded, for example, one, two, or three more times. The "Expand how many more times?" prompt 244 also provides the recipient an option to enter a specific amount indicating the number of times the recipient would like to have the particular corresponding shorthand item expanded in future messages by presenting an "Enter amount" option 246. Such an option may instead be provided to the sender before, during or after the sender writing the message to the recipient.

The system may use this selected number of times to continue expanding the shorthand item as a threshold such that, going forward, the system determines not to expand the shorthand item in the message if the number of times previous messages that were received by the recipient since the selection included a replacement of the shorthand item with the expansion exceeds the threshold. In some embodiments, an option may be provided for the recipient or sender to select a threshold total number of times the shorthand item is to be expanded for that recipient. In this case, the system determines going forward not to expand the shorthand item in the message if the total number of times all previous messages to the recipient included a replacement of the shorthand item with the expansion exceeds the selected threshold. The determination of whether to expand the shorthand item in the message may instead or additionally be based on an amount of time since a message to the recipient had the shorthand item expanded for that recipient. For example, if the recipient has not had a message with that shorthand item expanded for them in over a year, then the system may determine to expand the shorthand item. This amount of time may also be selectable by the sender or recipient, for example, to be 1 month, 3 months, 6 months, 1 year, 2 years, 3 years or any other amount of time.

Information indicating the recipient's preferences regarding selection of a total threshold number of times, amount of time and this option of how many more times to have the shorthand item be expanded in future messages to that recipient may be stored on the message recipient communication device 118 of the recipient or remotely within a user profile or an account associated with the recipient. Also, this information may be stored on the message sender communication device 116 of the sender or remotely within a user profile or an account associated with the sender. For example, such preferences may be stored at the shorthand item processing server 112 shown in FIG. 1. In this manner, such preferences are able to be accessed and followed across multiple devices associated with the sender and recipient. Such preferences are also able to be accessed and followed by multiple senders to apply when sending messages to that recipient. In other embodiments, such preferences may be set or selected by the sender and/or may be set at an initial default value. Such a selectable option may also be provided to the sender and may be set differently for different senders and/or recipients. Such user preferences may be stored at the message sender communication device 116, the shorthand item processing server 112 and/or the message recipient communication device 118.

Figure 2E:
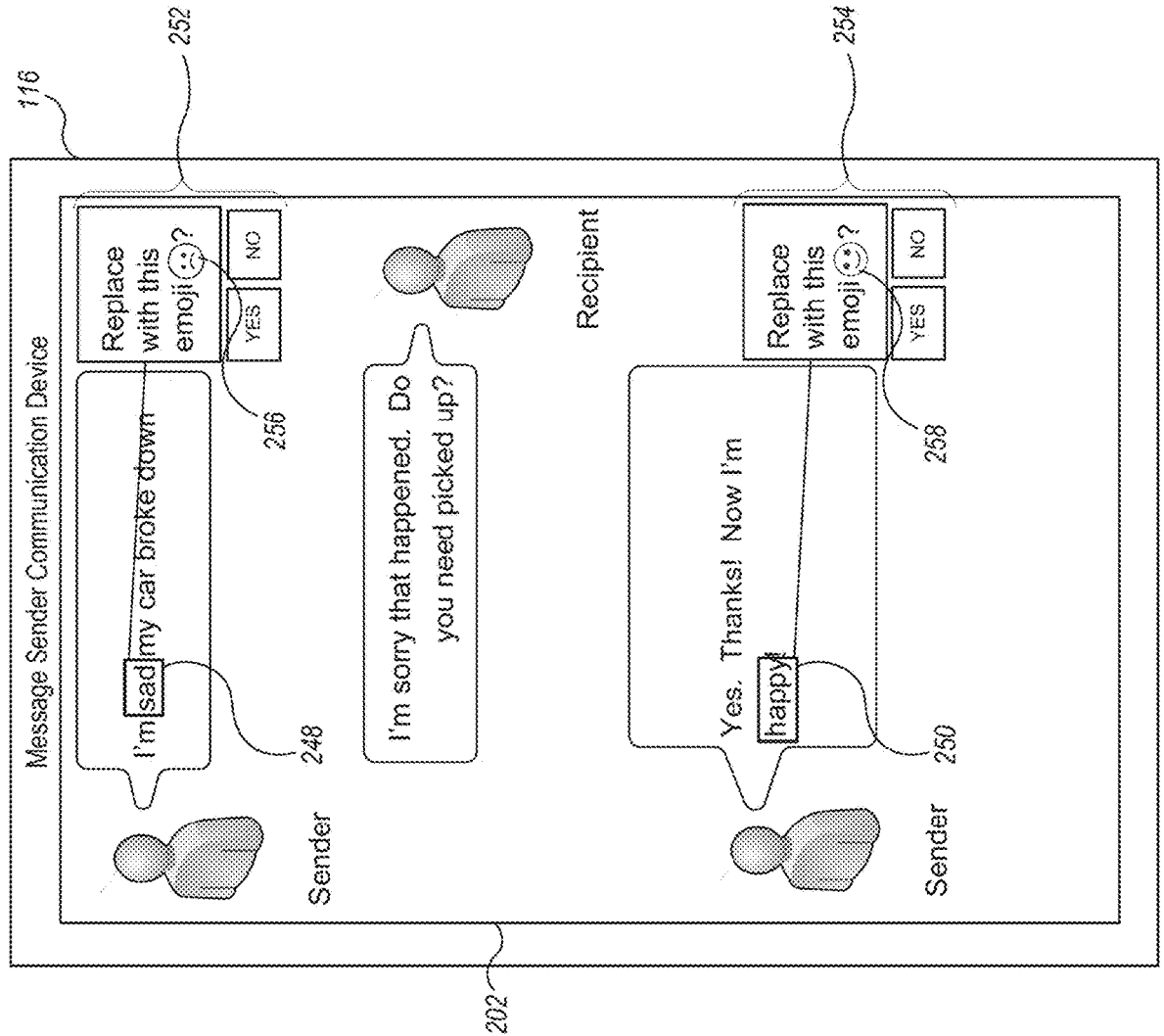
FIG. 2E is an example user interface on a message sender communication device showing example suggestions of shorthand items with which to replace various text in the messages from the sender, according to one embodiment.

FIG. 2E shows the example user interface 202 on the message sender communication device 116 presenting example suggestions of shorthand items with which to replace various text in the messages from the sender, according to one embodiment. In particular, the system may suggest shorthand items with which to replace text in messages as they are being written by the sender, sometime before they are sent to the recipient or even after they are sent to the recipient, but before they are presented to the recipient on the message recipient communication device 118. For example, as the message is being written by the sender, the system may suggest to the sender to replace the word "sad" typed in the message by the sender with a sad face emoji or sad face emoticon. This is shown in FIG. 2E on where the user interface 202 indicates text within the message that may be replaced by a shorthand item. In particular, the user interface 202 indicates the word "sad" may be replaced by a shorthand item by placing a box 248 in the message around the word "sad". This indication may instead or also be made by one or more of: highlighting, bolding, underlining or placing a circle around the text within the message presented to the sender. In response to the sender selecting the indicated text "sad", such as by touching or clicking on the indicated text, the user interface 202 presents a prompt 252 inquiring whether the sender would like to replace the text in the message with the corresponding shorthand item. In this case, the corresponding shorthand item is a sad face emoji 256. Depending on whether the sender selects "YES" or "NO" in response to the prompt 252, the system will replace the text "sad" with a sad face emoji 256 in the present message to the recipient. This may also cause, or cause an option to be provided to the sender to cause, the particular text to be replaced with that particular shorthand item in all future messages to that recipient, in all future messages to a select group of recipients or in all future messages to all recipients, depending on a preference selectable by the sender and/or previous messages sent to the recipient.

In some embodiments, particular suggested shorthand items may be suggested based on one or more of: the recipient of the message, location of the recipient of the message, language associated with the recipient of the message, the context of the particular text within the message and/or within the conversation, preferences of the sender with respect to the particular recipient, preferences of the recipient, preferences of the recipient with respect to the particular sender, previous expansions made in messages to the recipient and previous expansions of messages received by the sender. For example, there may be a list of shorthand items associated with the recipient that the recipient or sender has specifically selected to be included in messages sent to the recipient or whose meanings are known by the recipient. There may also or instead be a list of shorthand items associated with the recipient that the recipient or sender has selected to not be included in messages sent to the recipient or whose meanings are not known by the recipient. The system may infer whether the recipient knows the meanings of various shorthand items based on the recipient selecting to discontinue expansion of various shorthand items in messages to that recipient and/or based on a number of expansions of particular shorthand items having already been performed in messages to that recipient. Based on this inference and/or stored user preferences of the recipient or sender, the system may suggest particular shorthand items or not suggest any shorthand items to replace text in the message to the recipient. Such shorthand items can also replace text messages that are or have been converted from audio messages. For example, when the sender says a phrase in an audio message that is to be converted to a textual message, a corresponding shorthand item may replace that phrase in the text message the recipient receives that is otherwise a transcript of that audio message. The sender may also be provided options as described herein regarding which shorthand items to include.

As another example, the user interface 202 indicates the word "happy" may be replaced by a shorthand item by placing a box 250 in the message around the word "happy". This indication may instead or also be made by one or more of: highlighting, bolding, underlining or placing a circle around the text within the message presented to the sender. In response to the sender selecting the indicated text "happy", such as by touching or clicking on the indicated text, the user interface 202 presents a prompt 254 inquiring whether the sender would like to replace the text with a corresponding shorthand item in the message sent to the recipient. In this case, the corresponding shorthand item is a happy face emoji 258. Depending on whether the sender selects "YES" or "NO" in response to the prompt 254, the system will replace the text "happy" with a happy face emoji 258 in the present message to the recipient. This may also cause, or cause an option to be provided to the sender to cause, the particular text to be replaced with that particular shorthand item in all future messages to that recipient, in all future messages to a select group of recipients or in all future messages to all recipients, depending on a preference selectable by the sender.

Information indicating the sender's preferences regarding this option of having particular shorthand items replace particular text in messages from that sender may be stored on the message sender communication device 116 of the sender or remotely within a user profile or an account associated with the sender. For example, such preferences may be stored at the shorthand item processing server 112 shown in FIG. 1. In this manner, such preferences are able to be accessed and followed across multiple devices associated with the sender and recipient. Such preferences are also able to be accessed and used by multiple other users and systems. For example, the system may select to not have particular shorthand items expanded in messages sent to that sender when that sender has selected to have text in the messages that sender sends be replaced by those particular shorthand items. The system may infer that the fact that the sender has selected to have text in the messages that sender sends be replaced by those particular shorthand items means that sender already knows what those shorthand items mean and does not need to have them expanded in messages received by the sender. Furthermore, the determination of which suggestions to provide to the sender can occur at the sender's device before sending the message or at a server located remotely from the sender's device.

Figure 2F:
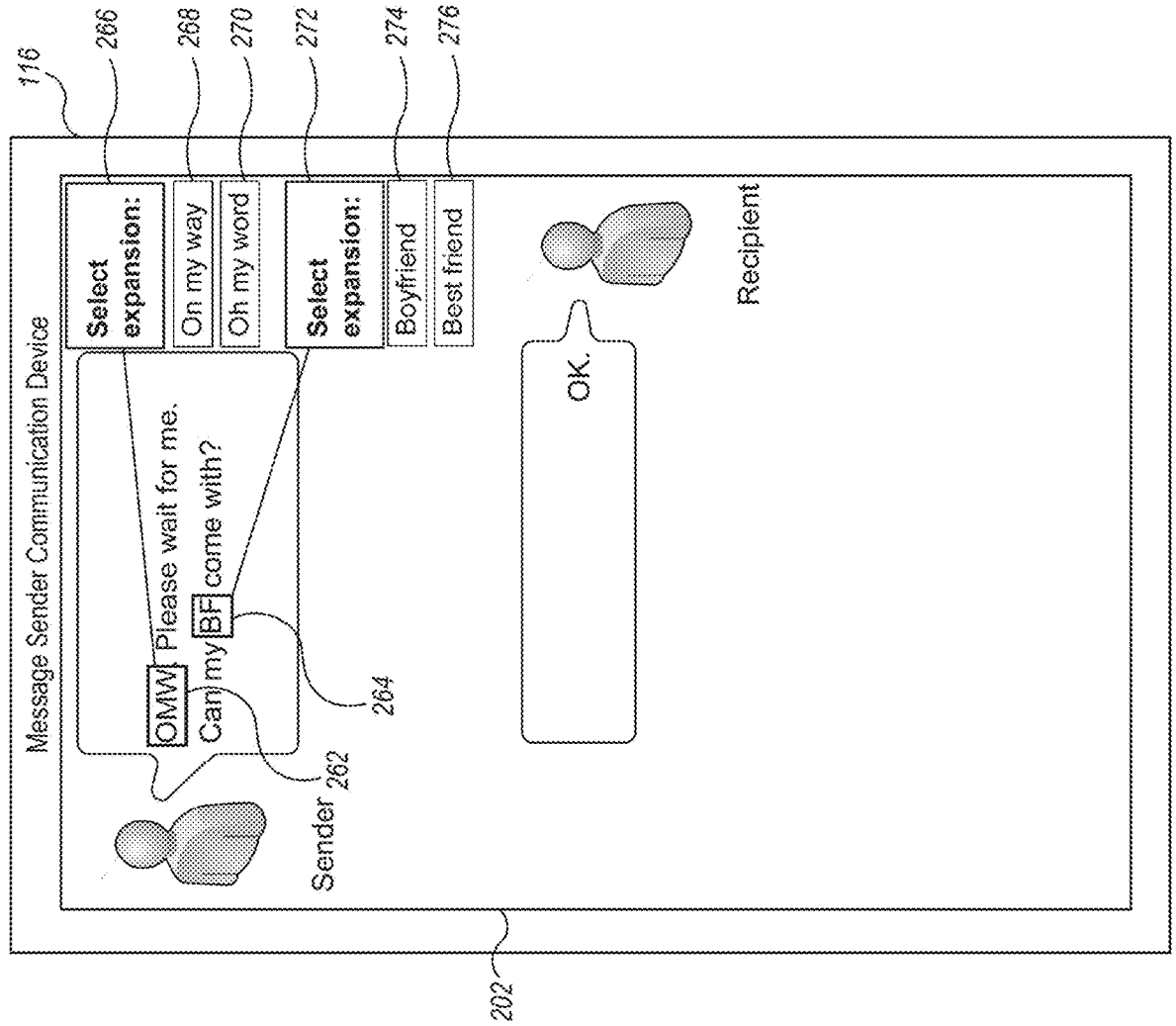
FIG. 2F is an example user interface on a message sender communication device showing example suggestions of expansions with which to replace various text in the messages from the sender when they are presented to the recipient, according to one embodiment.

FIG. 2F shows the example user interface 202 on the message sender communication device 116 presenting example suggestions of expansions with which to replace various text in the messages from the sender when they are presented to the recipient, according to one embodiment. Often, a shorthand item may have many possible meanings. Thus, as the sender is writing the message or sometime before the message is sent, the system may present the sender with multiple expansions from which to select that will replace a particular occurrence of a shorthand item in the message. As one example, the user interface 202 shown in FIG. 2F indicates particular text in the message being written that may be able to be expanded in the present message and/or in the message presented to the recipient on the message recipient communication device 118. In particular, the user interface 202 indicates the shorthand item "OMW" has available expansions by placing a box 262 in the message around the "OMW" shorthand item. This indication may instead or also be made by one or more of: highlighting, bolding, underlining or placing a circle around the shorthand item within the message presented to the sender. In response to the sender selecting the indicated "OMW" shorthand item, such as by touching or clicking on the indicated item, the user interface 202 presents a prompt 266 providing the available expansions corresponding to that shorthand item.

In this case, the available selectable expansions presented are "On my way" 268 and "Oh my word" 270. Depending on whether the sender selects "On my way" 268 or "Oh my word" 270 in response to the prompt 266, the system will replace the "OMW" shorthand item either the "On my way" 268 or the "Oh my word" 270 expansion. This may also cause, or cause an option to be provided to the sender to cause, the particular shorthand item to be replaced with that particular expansion in all future messages to that recipient, in all future messages to a select group of recipients or in all future messages to all recipients, depending on a preference selectable by the sender. In some embodiments, a similar prompt may be presented when there is only one suggested expansion for that shorthand item. An option may also be presented by the user interface 202 to not expand the detected shorthand item at all.

As another example, the user interface 202 indicates the shorthand item "BF" has available expansions by placing a box 264 in the message around the "BF" shorthand item. This indication may instead or also be made by one or more of: highlighting, bolding, underlining or placing a circle around the shorthand item within the message presented to the sender. In response to the sender selecting the indicated "BF" shorthand item, such as by touching or clicking on the indicated item, the user interface 202 presents a prompt 272 providing the available expansions corresponding to that shorthand item. In this case, the available selectable expansions presented are "Boyfriend" 274 and "Best friend" 276. Depending on whether the sender selects "Boyfriend" 274 and "Best friend" 276 in response to the prompt 272, the system will replace the "BF" shorthand item either the "Boyfriend" 274 or "Best friend" 276 expansion. This may also cause, or cause an option to be provided to the sender to cause, the particular shorthand item to be replaced with that particular expansion in all future messages to that recipient, in all future messages to a select group of recipients or in all future messages to all recipients, depending on a preference selectable by the sender.

Figure 3:
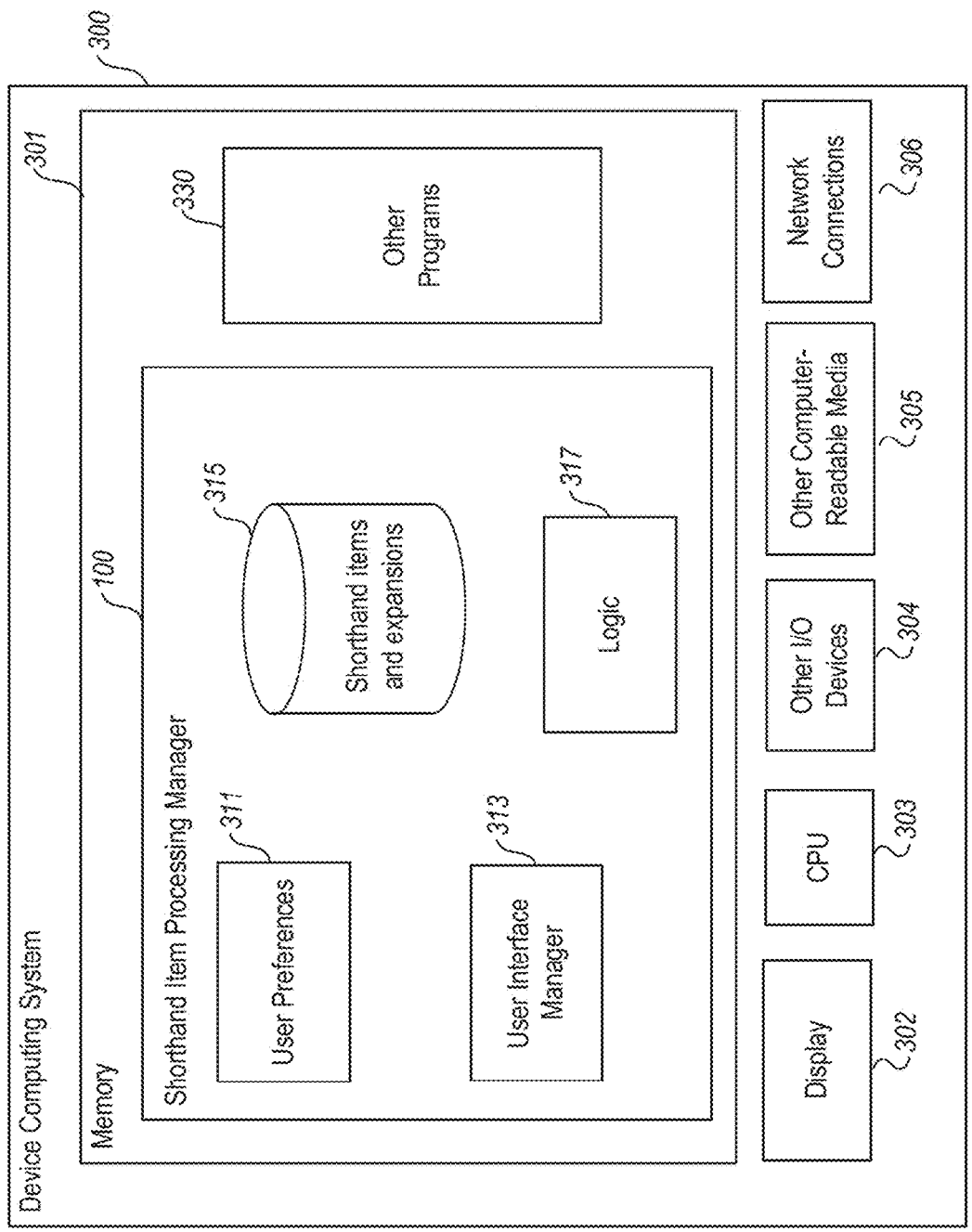
FIG. 3 is a block diagram of a computing system for practicing example embodiments of systems and methods for processing shorthand items in electronic communications, according to one embodiment.

FIG. 3 is a block diagram of a computing system for practicing example embodiments of systems and methods for processing shorthand items in electronic communications, according to one embodiment. FIG. 3 shows a device computing system 300 that may be utilized to implement a shorthand item processing manager 100 of the message sender communication device 116 and/or the message recipient communication device 118. However, the same or similar computing system to that of device computing system 300, or applicable components of the device computing system 300, may be utilized by the shorthand item processing server 112 and/or the shorthand item database 114 to implement the functions of the shorthand item processing server 112 and shorthand item database 114 described herein. In one embodiment, the device computing system 300, or applicable portions thereof, is part of an electronic communication device, such as message sender communication device 116 or message recipient communication device 118. In some embodiments, the device computing system 300, or applicable portions thereof, may be part of a computer or server device, such as shorthand item processing server 112 or shorthand item database 114.

The shorthand item processing manager 100 implements the processes and algorithms described herein for processing shorthand items in electronic communications on the various devices shown in FIG. 1. For example, the shorthand item processing manager 100 may include or implement components of a text messaging application, chat application, software plug-in, application programming interface (API) or other system module that performs the algorithms described herein for processing shorthand items in electronic communications. Each device shown in FIG. 1 may have its own version of the shorthand item processing manager 100 that implements the processes and algorithms that the respective device performs as described herein. One or more general purpose or special purpose computing systems/devices may be used to implement the shorthand item processing manager 100. In addition, the device computing system 300 may comprise one or more distinct computing systems/devices and may span distributed locations. Furthermore, each block shown may represent one or more such blocks as appropriate to a specific embodiment or may be combined with other blocks. Also, the shorthand item processing manager 100 may be implemented in software, hardware, firmware, or in some combination to achieve the capabilities described herein.

In the embodiment shown, device computing system 300 comprises a computer memory ("memory") 301, a user interface display 302 (which may be a touchscreen in some embodiments), one or more Central Processing Units ("CPUs") 303, Input/Output devices 304 (e.g., touchscreen, keyboard, mouse, RF or infrared receiving device, CRT or LCD display, and the like), other computer-readable media 305, and network connections 306. Network connections 306 represent the communication modules, interfaces, modems, network adapters, tuners, demodulators, demultiplexers, packet filters, network equipment, etc., of the device computing system 300 that are configured and operable to receive data from and interface with the devices of FIG. 1 described herein over communication system 108.

The shorthand item processing manager 100 is shown residing in memory 301. In other embodiments, some portion of the contents and some of or all of the components of the shorthand item processing manager 100 may be stored on and/or transmitted over the other computer-readable media 305. The components of the shorthand item processing manager 100 execute on one or more CPUs 303 and cause the algorithms shown in FIGS. 4-6 and described herein to be performed. The components of the shorthand item processing manager 100 also execute on one or more CPUs 303 in a manner to process shorthand items according to the algorithms shown in FIGS. 4-6 and described herein.

Other code or programs 330 (e.g., messaging applications, operating system, network layer stack, graphics programs, application programming interfaces (APIs) and the like) and potentially other data repositories, also reside in the memory 301, and preferably execute on one or more CPUs 303. Of note, one or more of the components in FIG. 3 may not be present in any specific implementation. For example, some embodiments may not provide other computer readable media 305 or a display 302.

In some embodiments, the shorthand item processing manager 100 may include a user preferences module 311, a user interface manager 313, shorthand items and expansions data repository 315 that includes various shorthand items and associated expansions, and logic 317 that includes the program code to implement the processes of the shorthand item processing manager 100 described herein. Other and/or different modules may be implemented. The shorthand item processing manager 100 may interact via network connections 306 with the other devices shown in FIG. 1 and various other devices not shown in FIG. 1 via the communication system 108 shown in FIG. 1.

The user preferences module 311 stores data representing the user preferences and selections described herein as well as default values set for the user. This data may include, but is not limited to, information indicating the recipient's preferences regarding the option whether to have particular shorthand items be expanded in messages to that recipient, which may be stored on the message recipient communication device 118 of the recipient or remotely within a user profile or an account associated with the recipient. Also, this information indicating the recipient's preference regarding the option to have particular shorthand items expanded in messages to that particular recipient may be stored on the message sender communication device 116 of the sender or remotely within a user profile or an account associated with the sender. For example, such preferences may be stored at the shorthand item processing server 112 shown in FIG. 1. In this manner, such preferences are able to be accessed and followed across multiple devices associated with the sender and recipient. Such preferences are also able to be accessed and followed by multiple senders to apply when sending messages to that recipient.

For example, this data stored by the user preferences module 311 may also include information indicating the recipient's preferences regarding selection of a total threshold number of times, amount of time, and the option of how many more times, to have the shorthand item be expanded in future messages to that recipient. This information may be stored on the message recipient communication device 118 of the recipient or remotely within a user profile or an account associated with the recipient. Also, this information may be stored on the message sender communication device 116 of the sender or remotely within a user profile or an account associated with the sender. For example, such preferences may be stored at the shorthand item processing server 112 shown in FIG. 1. In this manner, such preferences are able to be accessed and followed across multiple devices associated with the sender and recipient. Such preferences are also able to be accessed and followed by multiple senders to apply when sending messages to that recipient. In other embodiments, such preferences may be set or selected by the sender and/or may be set at an initial default value. Such a selectable option may also be provided to the sender and may be set differently for different senders and/or recipients. Such user preferences may be stored at the message sender communication device 116, the shorthand item processing server 112 and/or the message recipient communication device 118.

The user interface manager 313 provides a view and a controller that facilitate user interaction with the shorthand item processing manager 100, an operating system, other messaging applications, or their various components. For example, the user interface manager 313 provides interactive graphical user interface screens and/or elements that provide the user interfaces shown in FIGS. 2A-2F and described herein. The user interface manager 313 also may provide the user the ability to configure the shorthand item processing manager 100 and select user preferences as described herein. For example, the user may configure the shorthand item processing manager 100 via the interactive graphical user interface to determine not to expand the shorthand item in the message if a determined number of times previous messages to the recipient included a replacement of the shorthand item with the expansion exceeds a threshold. In some embodiments, the shorthand item processing manager includes an application program interface ("API") that provides programmatic access to one or more functions of the shorthand item processing manager 100. For example, such an API may provide the shorthand item processing server 112 a programmatic interface to one or more functions of the shorthand item processing manager 100 residing on the message sender communication device 116 and/or message recipient communication device 118. These may be invoked by one of the other programs 330 or some other module of the message sender communication device 116 and/or message recipient communication device 118. For example, the shorthand item processing manager 100 may be invoked or utilized by another program managing the overall operation of the message sender communication device 116 and/or message recipient communication device 118. In some embodiments, such an API may provide the message sender communication device 116 and/or message recipient communication device 118 a programmatic interface to one or more functions of the shorthand item processing manager 100 residing on the shorthand item processing server 112.

In an example embodiment, components or modules of the shorthand item processing manager 100 are implemented using standard programming techniques. For example, the shorthand item processing manager 100 may be implemented as a "native" executable running on the CPU 303, along with one or more static or dynamic libraries. In other embodiments, the shorthand item processing manager 100 may be implemented as instructions processed by a virtual machine that executes as one of the other programs 330. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In a software or firmware implementation, instructions stored in a memory cause, when executed, one or more processors of the device computing system 300 to perform the functions of the shorthand item processing manager 100. For example, instructions stored in memory when executed by a computer processor modify the data in the same or another memory address space, thus performing the functions of the shorthand item processing manager 100. Alternatively, instructions stored in memory when executed by a processor, could modify the control registers of an application specific integrated circuit (ASIC) to configure it to perform the functions of the shorthand item processing manager 100. Such an ASIC may directly access and modify the memory of the computer processor without the intervention of the computer processor (DMA operation). In one embodiment, instructions, when executed, cause the CPU 303 or some other processor, such as an I/O controller/processor, to buffer or otherwise record programming, such as by consuming program data and writing it to a disk or other storage device, by initiating a suitable DMA operation, or the like. Similarly, the CPU 303 or other processor may be configured to perform other operations such as recording and sending media content to the media content client 126.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Also, functions could be implemented and/or performed by each component/module, and in different orders, and by different components/modules, yet still achieve the functions of the shorthand item processing manager 100. For example, one way (broadcast) and/or two-way (interactive) wide area networks (WAN) may be used for electronic communication. Both types of networks may use storage local to one or more of the devices shown in FIG. 1 and under local control on the local area network (LAN).

In addition, programming interfaces to the data stored as part of the shorthand item processing manager 100, such as in the shorthand items and expansions data repository 315, can be available by standard mechanisms such as through C, C++, C#, and Java APIs; libraries for accessing files, databases, or other data repositories; through scripting languages such as XML; or through Web servers, FTP servers, or other types of servers providing access to stored data. The shorthand items and expansions data repository 315 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of a shorthand item processing manager.

Furthermore, in some embodiments, some or all of the components of the shorthand item processing manager 100 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on, or transmitted/communicated by, various non-transitory or transitory computer-readable mediums (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

One or more of the same or similar computing system and implementation technologies described above with respect to device computing system 300 and implementation of the shorthand item processing manager 100 may be utilized by any of the devices shown in FIG. 1 to implement the functions of the system for processing shorthand items in electronic communications described herein.

Figure 4:
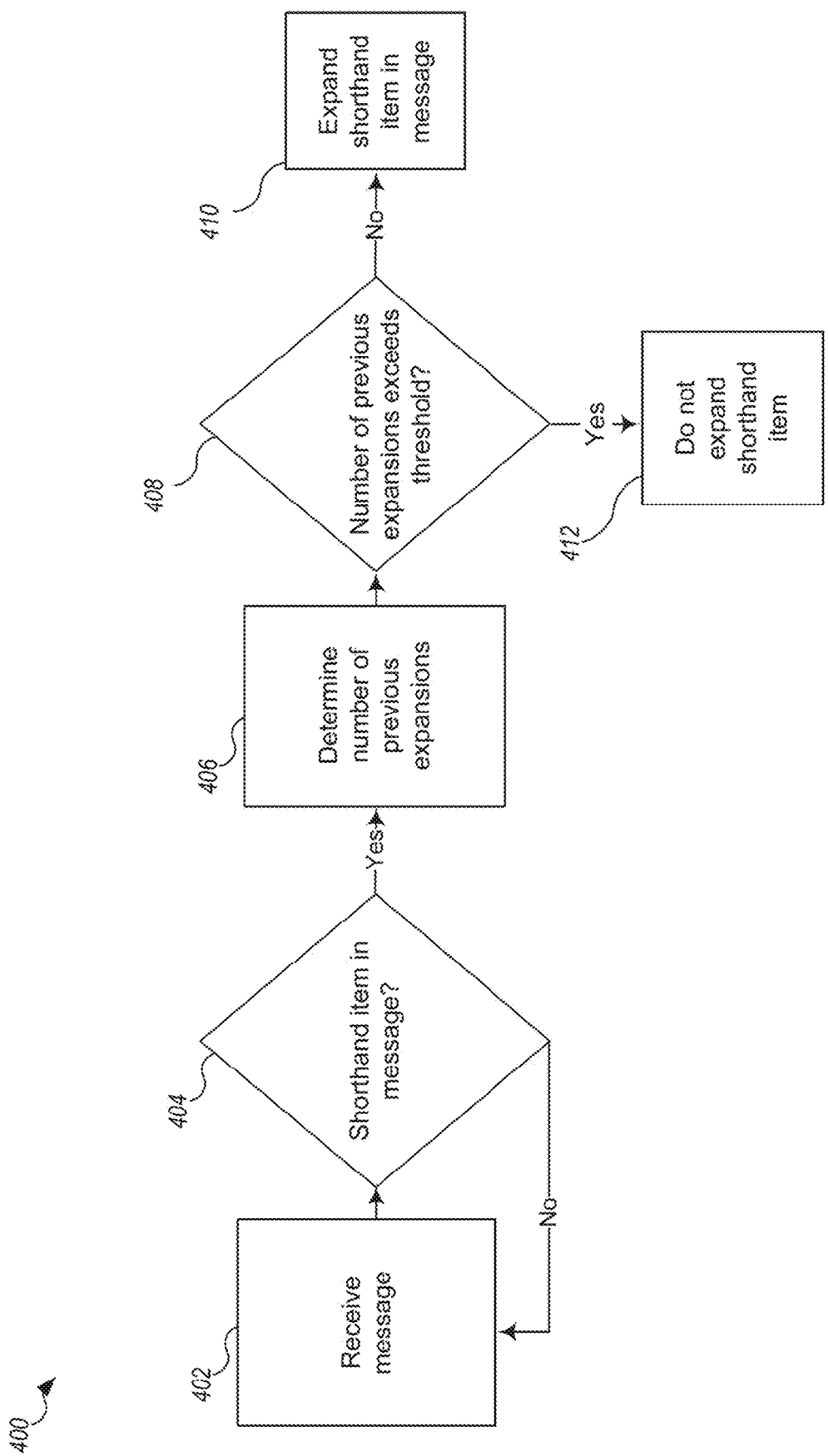
FIG. 4 is a flow diagram of an example method for determining whether to expand shorthand items in electronic communications, according to one embodiment.

FIG. 4 is a flow diagram of an example method 400 for determining whether to expand shorthand items in electronic communications, according to one embodiment.

At 402, the message recipient communication device 118 receives an electronic message for a recipient.

At 404, in response to receiving the electronic message, the message recipient communication device 118 determines whether there exists a shorthand item in the electronic message. If it was determined there does not exist a shorthand item in the electronic message, then process proceeds to 402.

At 406, if it was determined there exists a shorthand item in the electronic message, then message recipient communication device 118 determines a number of times previous messages to the recipient included a replacement of the shorthand item with the expansion.

At 408, the message recipient communication device 118, based on the determined number of times previous messages to the recipient included a replacement of the shorthand item with the expansion, determines whether to expand the shorthand item in the electronic message.

At 410, if it was determined to expand the shorthand item in the electronic message, then the message recipient communication device 118 expands the shorthand item in the received electronic message.

At 412, if it was determined to not expand the shorthand item in the electronic message, then the message recipient communication device 118 does not expand the shorthand item in the received electronic message.

One or more of 402, 404, 406, 408, 410 and 412 may be performed by the message sender communication device 116, message recipient communication device 118, shorthand item processing server 112 or shorthand item database 114 in various embodiments.

Figure 5:
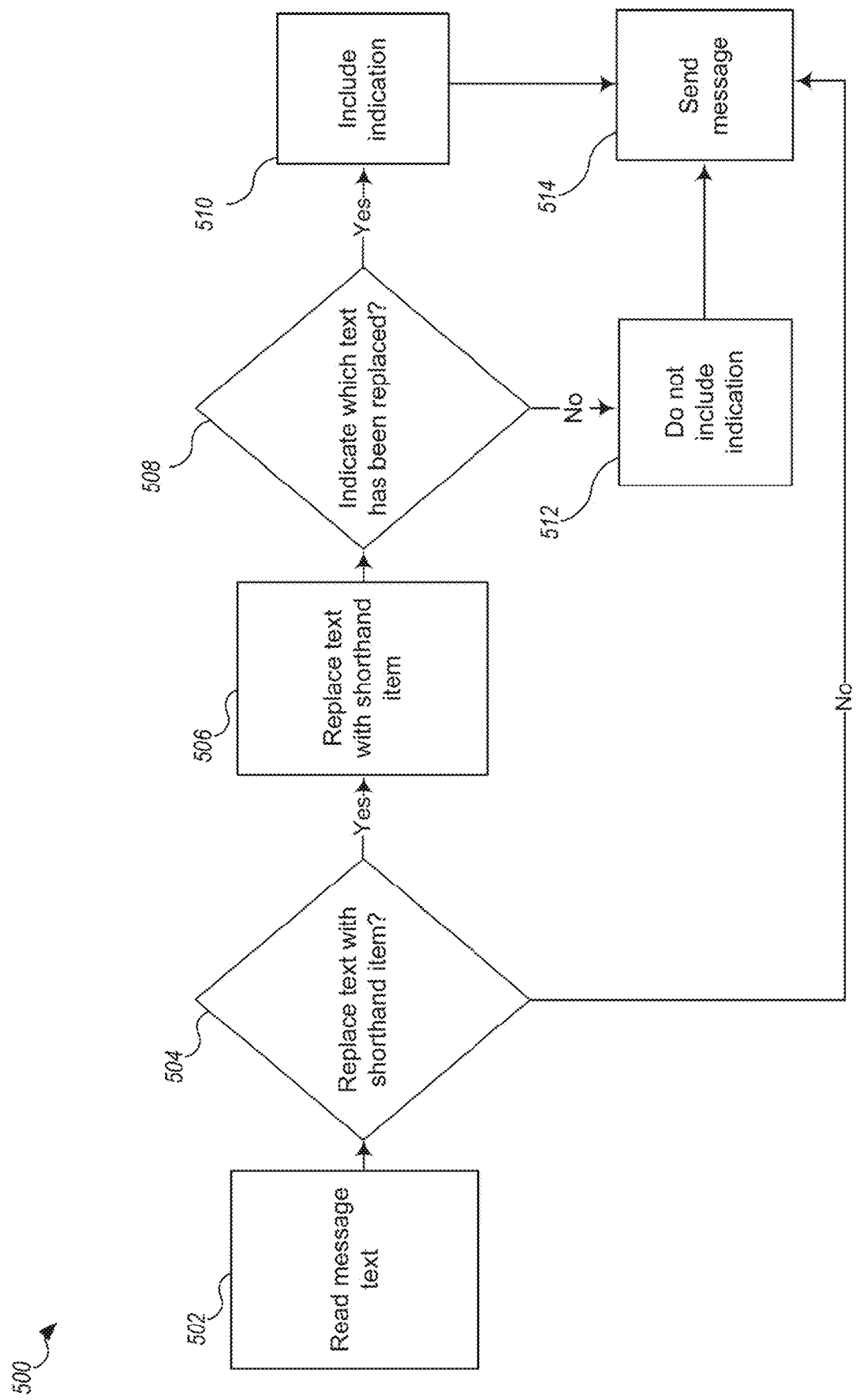
FIG. 5 is a flow diagram of an example method for replacing text with shorthand items in electronic communications, according to one embodiment.

FIG. 5 is a flow diagram of an example method 500 for replacing text with shorthand items in electronic communications, according to one embodiment.

At 502, the message sender communication device 116 reads text of an electronic message to be sent to at least one recipient.

At 504, the message sender communication device 116 makes a determination whether to replace at least some of the text of the message with a shorthand item. If a determination was made to not replace at least some of the text of the message with a shorthand item, the process proceeds to 514 and the message sender communication device 116 causes at least one communications module to send the message to at least one recipient.

At 506, if a determination was made to replace at least some of the text of the message with a shorthand item, then the message sender communication device 116 replaces at least some text in the message with at least one shorthand item.

At 508, the message sender communication device 116 makes a determination of whether to include in the message one or more indications of which text in the message has been replaced with a shorthand item. If a determination was made to not include in the message one or more indications of which text in the message has been replaced with a shorthand item, the process proceeds to 512 and does not include in the message one or more indications of which text in the message has been replaced with a shorthand item.

At 510, the message sender communication device 116 includes in the message one or more indications of which text in the message has been replaced with a shorthand item.

At 514, the message sender communication device 116 causes at least one communications module to send the message to at least one recipient. In some embodiments, the message is to be broadcast or otherwise sent to multiple recipients. In this case message sender communication device 116 may expand particular shorthand items in the message for some recipients and not for others. This may be according to user preferences selected by the recipient or the sender.

One or more of 502, 504, 506, 508, 510, 512 and 514 may be performed by the message sender communication device 116, shorthand item processing server 112 or shorthand item database 114 in various embodiments.

Figure 6:
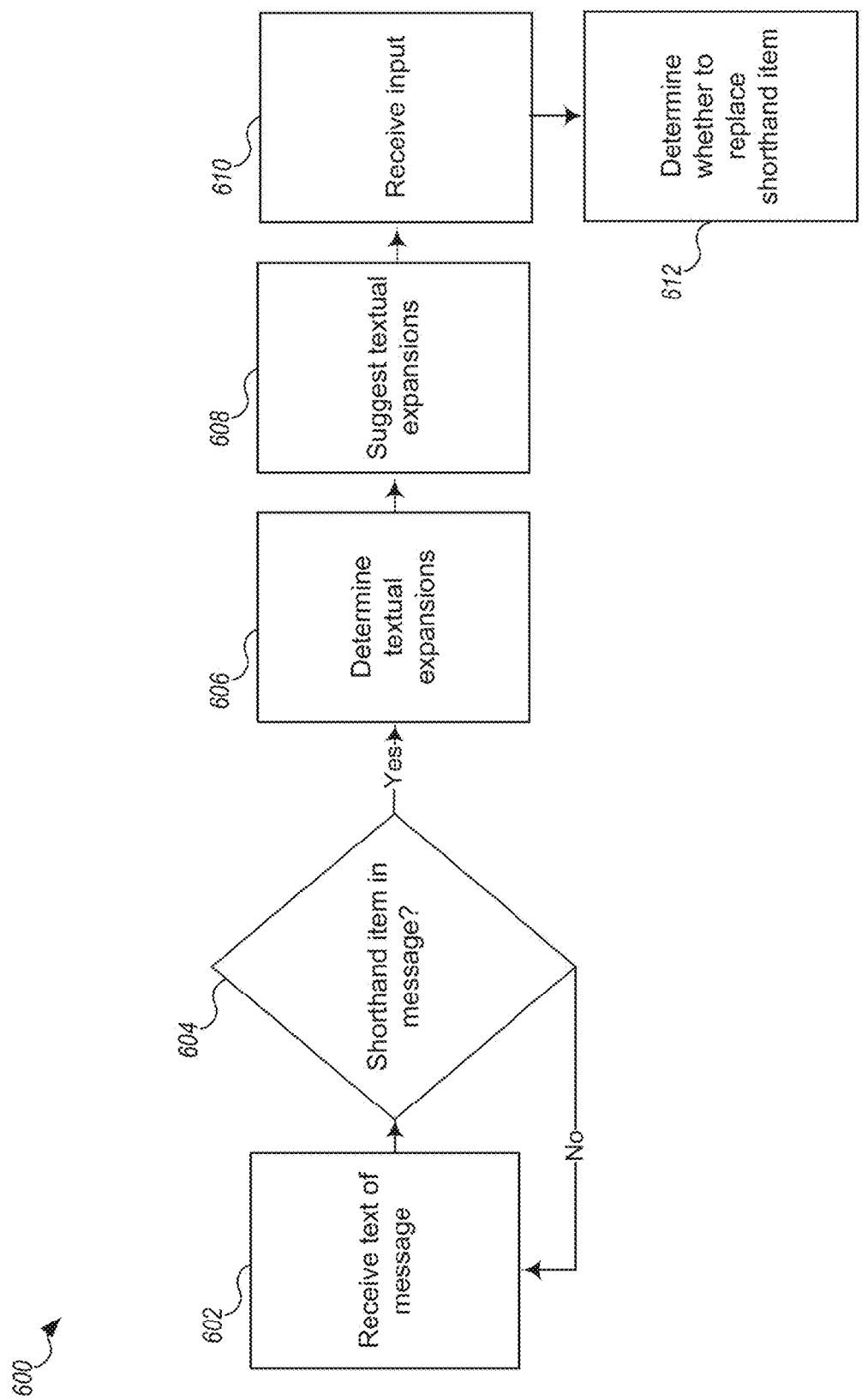
FIG. 6 is a flow diagram of an example method for suggesting expansions of shorthand items in electronic communications, according to one embodiment.

FIG. 6 is a flow diagram of an example method 600 for suggesting expansions of shorthand items in electronic communications, according to one embodiment.

At 602, the message sender communication device 116 receives text of an electronic message for a recipient as the message is being written by a sender of the message.

At 604, in response to receiving the text of the electronic message, the message sender communication device 116 makes a determination that there exists a shorthand item in the electronic message. If a determination was made that there does not exist a shorthand item in the electronic message, the process returns to 602.

At 606, if a determination was made that there exists a shorthand item in the electronic message, the message sender communication device 116 determines one or more textual expansions of the shorthand item that represent a possible meaning of the shorthand item.

At 608, the message sender communication device 116 suggests at least one of the one or more textual expansions of the shorthand item to a sender of the message.

At 610, the message sender communication device 116 receives input from the sender in response the suggestion of at least one of the one or more textual expansions of the shorthand item.

At 612, the message sender communication device 116 determines whether to replace the shorthand item in the message with one of the one or more expansions of the shorthand item based on the received input from the sender in response the suggestion.

One or more of 602, 604, 606, 608, 610 and 612 may be performed by the message sender communication device 116, shorthand item processing server 112 or shorthand item database 114 in various embodiments.

While various embodiments have been described hereinabove, it is to be appreciated that various changes in form and detail may be made without departing from the spirit and scope of the invention(s) presently or hereafter claimed.

The invention claimed is:

1. A computer implemented method in an electronic communications system, the method comprising:
   receiving, by at least one computer processor, an electronic message for a recipient;
   in response to receiving the electronic message, making a determination, by at least one computer processor, that there exists a shorthand item in the electronic message;
   in response to the determination that there exists a shorthand item in the message, determining, by at least one computer processor, a number of times previous messages to the recipient included a replacement of the shorthand item with an expansion;
   based on the determined number of times previous messages to the recipient included a replacement of the shorthand item with the expansion, determining, by at least one computer processor, whether to expand the shorthand item in the electronic message; and
   if it was determined to expand the shorthand item in the electronic message based on the determined number of times previous messages to the recipient included a replacement of the shorthand item with the expansion, then expanding, by at least one computer processor, the shorthand item in the received electronic message.

2. The method of claim 1 wherein the determining whether to expand the shorthand item in the message includes:
   determining not to expand the shorthand item in the message if the determined number of times previous messages to the recipient included a replacement of the shorthand item with the expansion exceeds a threshold.

3. The method of claim 2 wherein the threshold is according to a setting that is electronically adjustable by at least one of: the recipient and a sender of the message.

4. The method of claim 2 wherein the threshold is different for different shorthand items.

5. The method of claim 1 wherein the expanding the shorthand item in the message includes replacing the shorthand item in the message with an expansion of the shorthand item inline in the electronic message.

6. The method of claim 5 wherein the expanding the shorthand item in the message further includes marking the expansion of the shorthand item which replaced the shorthand item in the message to indicate the expansion of the shorthand item which replaced the shorthand item.

7. The method of claim 6 wherein the marking the expansion of the shorthand item includes one or more of: highlighting the expansion of the shorthand item, underlining the expansion of the shorthand item, bolding the expansion of the shorthand item, placing a box around the expansion of the shorthand item, placing a box around the expansion of the shorthand item, and placing a symbol next to the expansion of the shorthand item.

8. The method of claim 6, further comprising:
   receiving, by at least one computer processor, user input resulting from interaction of the recipient with the expansion of the shorthand item; and
   displaying, by at least one computer processor, the shorthand item in response to the received user input resulting from interaction of the recipient with the expansion of the shorthand item.

9. The method of claim 8 wherein the interaction of the recipient with the expansion of the shorthand item is selected from the group consisting of: touching on a touch screen the expansion of the shorthand item or a symbol next to the expansion of the shorthand item, long-pressing on a touch screen the expansion of the shorthand item or a symbol next to the expansion of the shorthand item, clicking on the expansion of the shorthand item and double-clicking the expansion of the shorthand item.

10. The method of claim 1 wherein the shorthand item is selected from the group consisting of: an acronym, an abbreviation, jargon, slang, a code, a shortcut expression, an emoji, a sticker, an ideogram and an emoticon.

11. The method of claim 1 wherein the determining whether to expand the shorthand item in the message includes:
   determining whether the recipient has selected to have the shorthand item be expanded in messages to the recipient; and
   determining whether to expand the shorthand item in the message based on the determination of whether the recipient to whom the message was sent has selected to have the shorthand item be expanded in messages to the recipient.

12. The method of claim 1, further comprising:
   assigning, by at least one computer processor, a rating of the shorthand item in the message; and
   applying, by at least one computer processor, parental controls to the message based on the recipient to whom the message was sent and the assigned rating of the shorthand item in the message.

13. The method of claim 12 wherein the applying parental controls to the message includes determining to either not expand or to remove the shorthand item in the message based on the assigned rating and the recipient to whom the message was sent.

14. The method of claim 1 wherein the expanding the shorthand item in the message includes selecting an expansion of the shorthand item based on context of the shorthand item in the message.

15. The method of claim 1 wherein the expanding the shorthand item in the message includes:
communicating at least the shorthand item to a remote database of shorthand items and corresponding expansions of the shorthand items; and
in response to the communicating the shorthand item to a remote database, receiving from the remote database at least the expansion of the shorthand item.

16. The method of claim 15 wherein the communicating at least the shorthand item to the remote database includes communicating the entire electronic message to the remote database and the receiving from the remote database at least the expansion of the shorthand item includes receiving the entire electronic message from the remote database modified with an expansion of the shorthand item replacing each instance of the shorthand item that existed in the electronic message communicated to the remote database.

17. The method of claim 1 wherein the determining whether to expand the shorthand item in the message and the expanding the shorthand item in the message is performed before the message is ultimately received by an electronic communications device of the recipient.

18. The method of claim 1 wherein the determining whether to expand the shorthand item in the message and the expanding the shorthand item in the message is performed by an electronic communications device of the recipient that receives the electronic message.

19. An electronic communications system, comprising:
at least one computer processor;
at least one communications module coupled to the at least one computer processor; and
a memory coupled to the at least one computer processor, wherein the memory has computer-executable instructions stored thereon, that when executed, cause the at least one computer processor to:
read text of an electronic message to be sent to at least one recipient;
make a determination whether to replace at least some of the text of the message with a shorthand item;
based on the determination, replace at least some text in the message with at least one shorthand item;
make a determination of whether to include in the message one or more indications of which text in the message has been replaced with a shorthand item;
include in the message one or more indications of which text in the message has been replaced with a shorthand item based on the determination of whether to include one or more indications in the message of which text in the message has been replaced with a shorthand item;
cause the at least one communications module to send the message to the at least one recipient;
receive another electronic message;
in response to a determination that there exists another shorthand item in the other electronic message, determine a number of times previously received messages included a replacement of the other shorthand item with an expansion; and
based on the determined number of times previously received messages included a replacement of the other shorthand item with the expansion, expand, by a device of a recipient on which the other electronic message was received, the other shorthand item in the other electronic message.

20. The electronic communications system of claim 19 wherein the at least one computer processor is that of a device located remotely from an electronic communications device of a sender of the message.

21. The electronic communications system of claim 19 wherein the determination whether to replace at least some of the text of the message with a shorthand item is based on whether the at least one recipient of the message has selected to have text of messages to the at least one recipient be replaced with shorthand items.

22. The electronic communications system of claim 19 wherein the making the determination of whether to include an indication in the message of which text in the message has been replaced with a shorthand item includes:
determining a number of times previous messages to the at least one recipient included a particular shorthand item; and
determining to not include an indication in the message of which text in the message has been replaced with the particular shorthand item if the determined number of times previous messages to the at least one recipient included the particular shorthand item exceeds a threshold.

23. The electronic communications system of claim 19 wherein the indication in the message of which text in the message has been replaced with a shorthand item is a graphical user interface element that causes an expansion of the shorthand item to appear in the message in response to a recipient activating the indication in a user interface on which the message is displayed.

24. The electronic communications system of claim 19 wherein the shorthand item is selected from the group consisting of: an acronym, an abbreviation, jargon, slang, a code, a shortcut expression, an emoji, a sticker, an ideogram and an emoticon.

25. A non-transitory computer-readable storage medium having computer-executable instructions thereon that, when executed by at least one computer processor, cause at least one computer processor to:
receive text of an electronic message for a recipient as the message is being written by a sender of the message;
in response to receiving the text of the electronic message, make a determination that there exists a shorthand item in the electronic message;
in response to the determination that there exists a shorthand item in the message, determine one or more textual expansions of the shorthand item that represent a possible meaning of the shorthand item;
suggest at least one of the one or more textual expansions of the shorthand item to a sender of the message;
receive input from the sender in response to the suggestion of at least one of the one or more textual expansions of the shorthand item; and
determine whether to replace the shorthand item in the message with one of the one or more expansions of the shorthand item based on the received input from the sender in response the suggestion.

26. The non-transitory computer-readable storage medium of claim 25 wherein the received input from the sender in response the suggestion of at least one of the one or more textual expansions of the shorthand item includes input indicative of a selected one of the suggested at least one of the one or more expansions of the shorthand item, and wherein the computer-executable instructions, when executed by the at least one computer processor, further cause at least one computer processor to replace the shorthand item in the message with the selected one of the suggested at least one of the one or more expansions of the shorthand item.

27. The non-transitory computer-readable storage medium of claim 25 wherein the determination of whether to replace the shorthand item in the message with one of the one or more expansions of the shorthand item includes a determination to not replace the shorthand item in the message with one of the one or more expansions of the shorthand item if the received input from the sender is indicative of a selection by the sender to not replace the shorthand item in the message.

28. The non-transitory computer-readable storage medium of claim 25 wherein the determination of whether to replace the shorthand item in the message with one of the one or more expansions of the shorthand item is based on a number of times previous messages to the recipient included a replacement of the shorthand item with the one of the one or more expansions.

\* \* \* \* \*